US011977938B2

United States Patent
Sugihara et al.

(10) Patent No.: US 11,977,938 B2
(45) Date of Patent: May 7, 2024

(54) COLOR DISPLAY, AUTHENTICATION MEDIUM, AND METHOD OF DETERMINING AUTHENTICITY OF COLOR DISPLAY

(71) Applicant: TOPPAN INC., Tokyo (JP)

(72) Inventors: Keitaro Sugihara, Tokyo (JP); Akihito Kagotani, Tokyo (JP)

(73) Assignee: TOPPAN INC., Tokyo (JP)

( * ) Notice: Subject to any disclaimer, the term of this patent is extended or adjusted under 35 U.S.C. 154(b) by 58 days.

(21) Appl. No.: 17/699,665

(22) Filed: Mar. 21, 2022

(65) Prior Publication Data
US 2022/0215215 A1 Jul. 7, 2022

Related U.S. Application Data

(63) Continuation of application No. PCT/JP2020/036474, filed on Sep. 25, 2020.

(30) Foreign Application Priority Data

Sep. 25, 2019 (JP) .................................. 2019-174228

(51) Int. Cl.
G06K 19/06 (2006.01)
G02B 5/20 (2006.01)

(52) U.S. Cl.
CPC ........... *G06K 19/0614* (2013.01); *G02B 5/20* (2013.01)

(58) Field of Classification Search
CPC .... G06K 19/0614; G02B 5/20; G02B 5/1809; G02B 5/1852; G02B 5/18; G02B 5/1861; B42D 25/324; B42D 25/328
See application file for complete search history.

(56) References Cited

U.S. PATENT DOCUMENTS 7,864,424 B2 1/2011 Stuck et al.
2005/0128590 A1 6/2005 Schilling et al.
(Continued)

FOREIGN PATENT DOCUMENTS

CN 108693582 A 10/2018
JP 58-500916 A 6/1983
(Continued)

OTHER PUBLICATIONS

JP2008107471A Display Body and Printed Matter, 11 Pages. (Year: 2023).*

(Continued)

*Primary Examiner* — Tuyen K Vo
(74) *Attorney, Agent, or Firm* — Foley & Lardner LLP

(57) ABSTRACT

A forming mold has a surface in contact with a deposited film, a part or an entire part being a first wavy surface. A wave period of the first wavy surface is in a range of 250 nm or more and 500 nm or less. The deposited film conforms to the surface of the forming mold. The first wavy surface includes a plurality of rib surfaces, a plurality of groove surfaces, and a plurality of taper surfaces connecting the rib surfaces to the respective groove surfaces. The deposited film has a peak zone, a valley zone, and a transition zone. One of the peak zone, the valley zone, and the transition zone and another one of the peak zone, the valley zone, and the transition zone are different or has portions different in thickness and/or volume density.

15 Claims, 17 Drawing Sheets

(56) References Cited

U.S. PATENT DOCUMENTS

| | | | |
|---|---|---|---|
| 2009/0257126 A1 | | 10/2009 | Walter et al. |
| 2010/0193590 A1 | | 8/2010 | Komatsu et al. |
| 2012/0162771 A1 | | 6/2012 | Walter et al. |
| 2014/0085725 A1 | * | 3/2014 | Lochbihler ............ G02B 5/203 359/568 |
| 2015/0219807 A1 | | 8/2015 | Lochbihler |

FOREIGN PATENT DOCUMENTS

| | | | | |
|---|---|---|---|---|
| JP | 2008107471 A | * | 5/2008 | |
| JP | 2009-538937 A | | 11/2009 | |
| JP | 2010078821 A | * | 4/2010 | |
| JP | 2010-524070 A | | 7/2010 | |
| JP | 2014-047284 A | | 3/2014 | |
| JP | 2018-63305 A | | 4/2018 | |
| KR | 10-2004-0083078 A | | 9/2004 | |
| WO | WO-2007114976 A3 | * | 4/2008 | ........... G03H 1/0011 |
| WO | WO 2008/143087 A1 | | 11/2008 | |
| WO | WO-2010121362 A1 | * | 10/2010 | ............ B42D 25/29 |
| WO | WO-2012136777 A1 | * | 10/2012 | ............ B42D 25/00 |
| WO | WO-2013026747 A1 | * | 2/2013 | ............ B42D 25/23 |
| WO | WO-2019/068304 A1 | | 4/2019 | |

OTHER PUBLICATIONS

JP2018063305A Display Body and Manufacturing Method for Display Body, 23 Pages (Year: 2023).*

International Searching Authority, "International Search Report," issued in connection with International Patent Application No. PCT/JP2020/036474, dated Dec. 1, 2020, 7 pages.

International Searching Authority, "Written Opinion," issued in connection with International Patent Application No. PCT/JP2020/036474, dated Dec. 1, 2020, 5 pages.

Aubrecht Ivo et al: "Stacks of layers with periodical corrugations of interfaces as devices for document security", SPIE Proceedings; [Proceedings of SPIE ISSN 0277-786X], SPIE, US, vol. 11030, Apr. 23, 2019 (Apr. 23, 2019), pp. 1103019-1103019, XP060123473, DOI: 10.1117/12.2520739 ISBN: 978-1-5106-3673-6.

Extended European Search Report issued in connection with European Appl. No. 20868623.8 dated Sep. 6, 2023.

Office Action issued in corresponding Chinese Patent Application No. 202080067247.9, dated Jul. 4, 2023.

Office Action issued in corresponding Japanese Patent Application No. 2021-548470 dated Dec. 19, 2023 (13 pages).

* cited by examiner

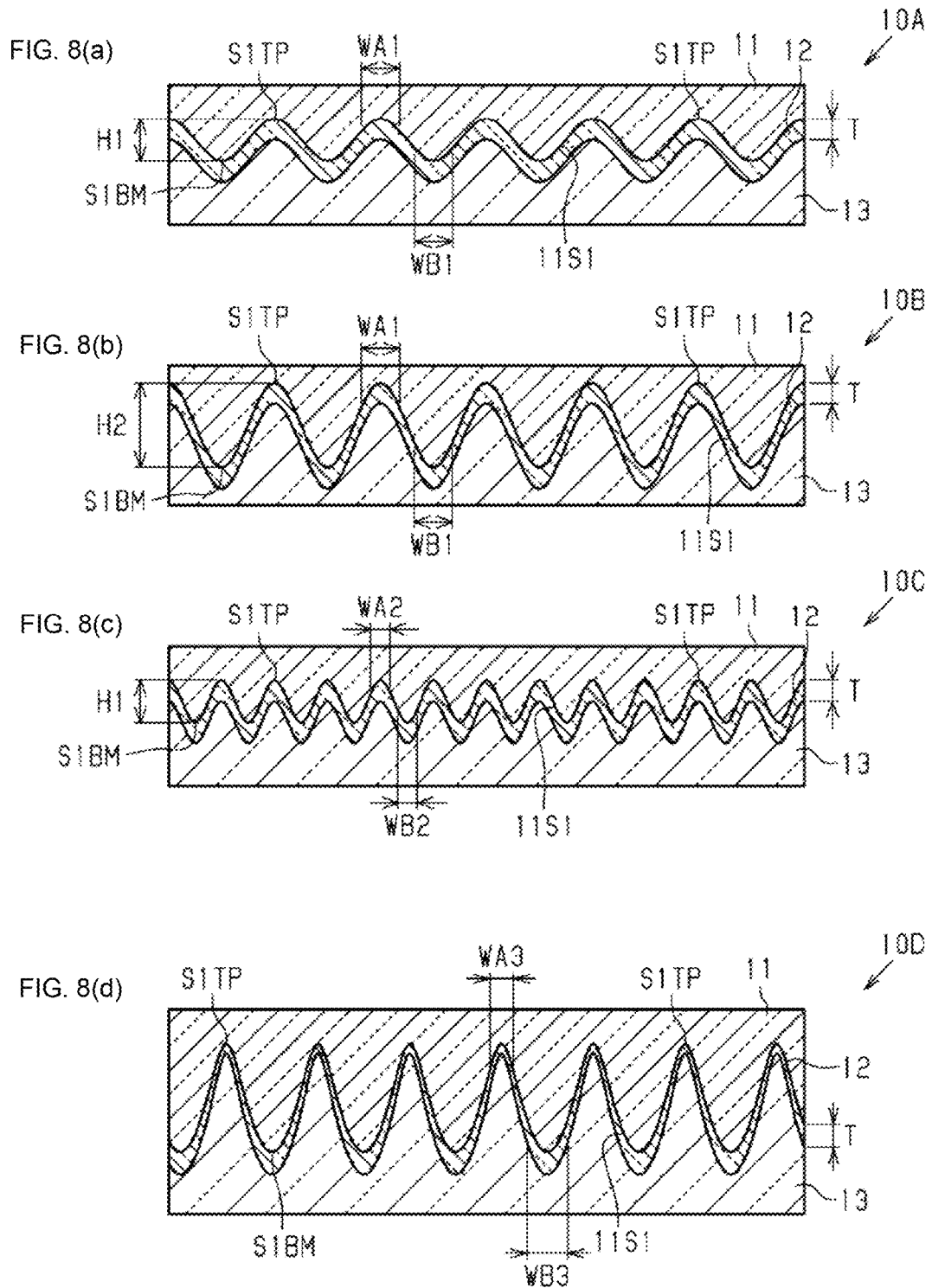

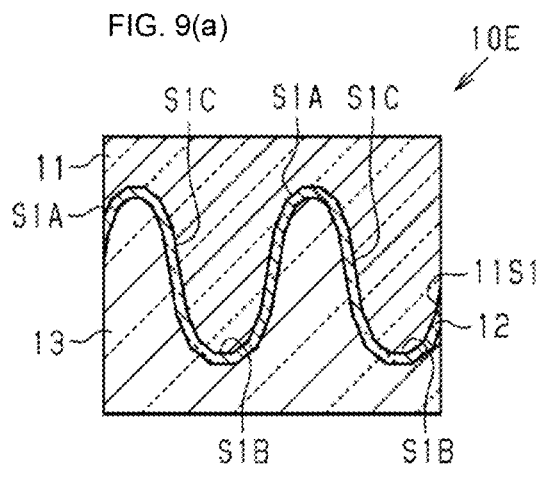
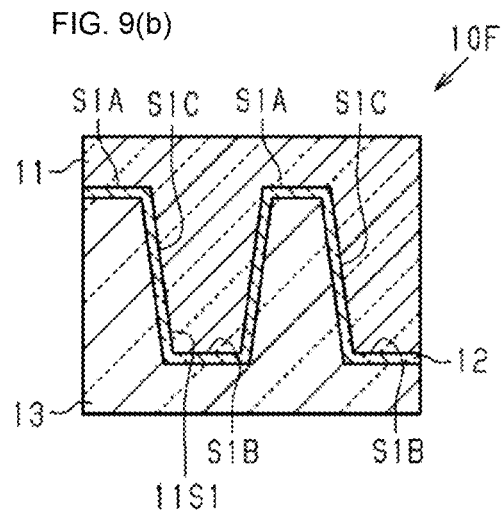
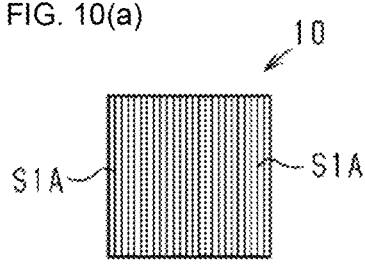
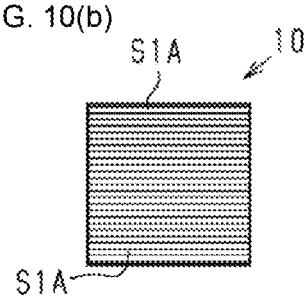
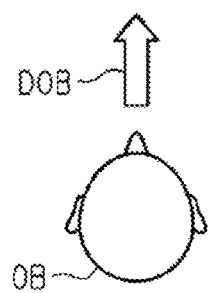
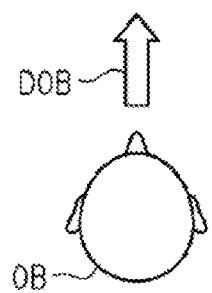

FIG.33
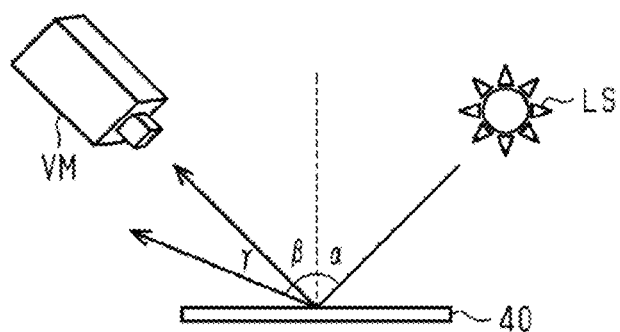
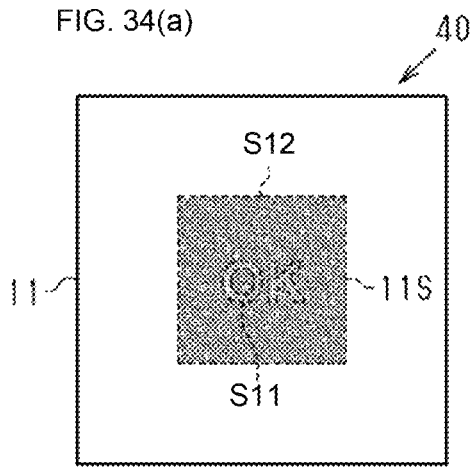
FIG. 34(a)
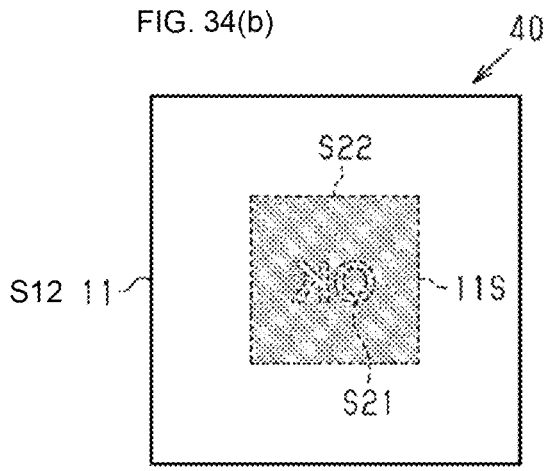
FIG. 34(b)

COLOR DISPLAY, AUTHENTICATION MEDIUM, AND METHOD OF DETERMINING AUTHENTICITY OF COLOR DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/036474, filed on Sep. 25, 2020, which is based upon and claims the benefit of priority to Japanese Patent Application No. 2019-174228, filed on Sep. 25, 2019; the disclosures of which are incorporated herein by reference in their entireties.

TECHNICAL FIELD

The embodiments of the present invention relate to a color display, an authentication medium, and a method of determining authenticity of the color display.

BACKGROUND

Optical devices using guided-mode resonance have been proposed. Such an optical device includes a subwavelength grating, which is a diffraction grating including elements arranged with a period smaller than the wavelength of visible light. When light is incident on the subwavelength grating, diffracted light is prevented from being reflected back into a space from which the incident light arrived, but reflection of light due to guided-mode resonance occurs. Guided-mode resonance is a phenomenon in which light in a specific wavelength range is propagated while being multiply reflected in an optical device to cause resonance, and thus the light in the wavelength range is reflected in the optical device as reflected light having a high intensity. Use has begun of such an optical device as a color display providing at least one of difficulty of counterfeiting and designability to an object to which the color display is applied (see, for example, Patent Literature 1).
[Citation List] [Patent Literature] [PTL 1] JP 2018-063305 A.

SUMMARY OF THE INVENTION

Technical Problem

The color display is required to reflect light having a specific wavelength and to allow a plurality of light beams having different wavelengths to emerge, according to the intended use of the color display, the environment in which the color display is used, and the expected function of the color display. Such a requirement has continued to grow in recent years due to variations in the use, environment, and function of color displays. Thus, there has been a demand for a color display capable of varying the wavelength of light reflected by the color display due to guided-mode resonance according to the environment in which the color display is used and the expected function of the color display. Furthermore, there is a demand for detection of counterfeit products by visual observation and verification of authenticity using a verifier.

An object of the embodiments of the present invention is to provide a color display capable of varying the wavelength of light reflected by the color display due to guided-mode resonance, an authentication medium, and a method of determining authenticity of the color display.

Solution to Problem

A color display for solving the above problem is a color display including a forming mold that is optically transmissive, a deposited film that is optically transmissive and is located on the forming mold, and a plastic protector that is optically transmissive and is located on the deposited film. The forming mold has a first refractive index, the plastic protector has a third refractive index, and the deposited film has a second refractive index, the second refractive index being higher than both the first refractive index and the third refractive index. The forming mold has a surface in contact with the deposited film, and a part or an entire part of the surface is a first wavy surface, a wave period of the first wavy surface being in a range of 250 nm or more and 500 nm or less. The deposited film conforms to the surface of the forming mold. The first wavy surface includes a plurality of rib surfaces, a plurality of groove surfaces, and a plurality of taper surfaces connecting the rib surfaces to the respective groove surfaces. The deposited film has a peak zone in contact with one of the rib surfaces, a valley zone in contact with one of the groove surfaces, and a transition zone in contact with one of the taper surfaces. One of the peak zone, the valley zone, and the transition zone and another one of the peak zone, the valley zone, and the transition zone are different from each other in at least one of thickness and volume density. Alternatively, one of the peak zone, the valley zone, and the transition zone has portions different from each other in at least one of thickness and volume density.

An authentication medium for solving the above problem includes the color display, and a support that supports the color display.

The color display composed of the forming mold, the deposited film, and the plastic protector includes a first waveguide layer, a second waveguide layer, and a third waveguide layer. The first waveguide layer is composed of a part of the forming mold and a part of the deposited film, the second waveguide layer is composed of a part of the forming mold, a part of the deposited film, and a part of the plastic protector, and the third waveguide layer is composed of a part of the deposited film and a part of the plastic protector. In the deposited film, the peak zone is mainly included in the first waveguide layer, the valley zone is mainly included in the third waveguide layer, and the transition zone is mainly included in the second waveguide layer. The ratios of the portions of the deposited film in the waveguide layers contribute to the values of the effective refractive indexes of the respective waveguide layers.

Thus, according to the color display and the authentication medium, in the case where the individual effective refractive indexes of the waveguide layers when at least one of thickness and volume density is uniform in the entire deposited film are used as the respective reference values of the effective refractive indexes of the waveguide layers, in one or more of the waveguide layers including a portion in which at least one of the thickness and the volume density is varied, the effective refractive index has a value different from the corresponding reference value. The wavelengths of the reflected light derived from the waveguide layers are determined by the values of the effective refractive indexes of the respective waveguide layers. Thus, the wavelengths of the reflected light derived from the waveguide layers can be adjusted by varying at least one of the thickness and the volume density of the deposited film. This makes it possible to vary the wavelength of the light reflected by the color display due to guided-mode resonance according to the number or position of portions in which at least one of the thickness and the volume density is varied.

The color display may be configured such that the first wavy surface has a first wavy portion, the first wavy portion has a first rib surface and a second rib surface of the plurality of rib surfaces and a first groove surface and a second groove surface of the plurality of groove surfaces, the first groove surface is adjacent to the first rib surface, and the second groove surface is adjacent to the second rib surface, and in a thickness direction of the color display, a first height is defined as a distance between the first rib surface and the first groove surface, and a second height is defined as a distance between the second rib surface and the second groove surface, the first height being different from the second height.

According to the color display, a part of the first wavy portion in which the height of the wavy surface is the first height and a part of the first wavy portion in which the height of the wavy surface is the second height have different effective refractive indexes of the waveguide layer. This enables the first wavy portion to reflect light having a different wavelength from light reflected by the first wavy portion having a uniform refractive index.

In the color display, the first wavy surface may have a second wavy portion, and the second wavy portion is a rib portion having a first width in a direction in which the rib surfaces and the groove surfaces are aligned. The groove surface may have a second width that is different from the first width. The second wavy portion may have a third rib surface and a fourth rib surface of the plurality of rib surfaces and a third groove surface and a fourth groove surface of the plurality of groove surfaces, the third and fourth rib surfaces having a first width and the third and fourth rib surfaces having a second width, the first width being different from the second width.

According to the color display, by setting the width of the rib surfaces to be different from the width of the groove surfaces in the second wavy portion, the second wavy portion has a different effective refractive index from the second wavy portion in which the rib surfaces and the groove surfaces have the same width. This enables the second wavy portion to reflect light having a different wavelength from light reflected by the second wavy portion in which the rib surfaces and the groove surfaces have the same width.

The color display may be configured such that the first refractive index is higher than the third refractive index, and the rib surfaces have a greater width than the groove surfaces in a direction in which the rib surfaces and the groove surfaces are arranged.

The color display may be configured such that the first refractive index is lower than the third refractive index, and the rib surfaces have a width less than the groove surfaces in a direction in which the rib surfaces and the groove surfaces are arranged.

According to the color displays, the difference between the effective refractive index of the first waveguide layer including the forming mold and the effective refractive index of the third waveguide layer including the plastic protector is larger than the difference between the first refractive index and the third refractive index. This enables the difference between the wavelength of light guided by the first waveguide layer and the wavelength of light guided by the third waveguide layer to be larger than the difference between the first refractive index and the third refractive index.

The color display may be configured such that in the deposited film, a peak thickness is defined as a thickness of a portion of the deposited film in the peak zone, a valley thickness is defined as a thickness of a portion of the deposited film in the valley zone, a peak density is defined as a volume density of the portion of the deposited film in the peak zone, and a valley density is defined as a volume density of the portion of the deposited film in the valley zone, and in at least part of the deposited film, the valley thickness is greater than the peak thickness or the valley density is higher than the peak density.

In some cases, an original plate for forming the forming mold is formed by performing electron beam lithography on a positive resist layer. Thus, the shape of portions of the resist layer that have been patterned by lithography is transferred to a surface of a resin layer to form rib surfaces of the forming mold. On the other hand, the shape of portions of the resist layer that have not been patterned by lithography is transferred to the surface of the resin layer to form groove surfaces of the forming mold. As a result, the rib surfaces have lower flatness than the groove surfaces. According to the color display, light is guided at higher efficiency in the third waveguide layer including the groove surfaces than in the first waveguide layer including the rib surfaces. This can prevent the low flatness of the rib surfaces from reducing the brightness of the light reflected by the color display.

The color display may be configured such that the first wavy surface has a first wavy portion and a second wavy portion, a wave period of the first wavy portion is equal to a wave period of the second wavy portion, a spectrum of zero-order diffracted light reflected by the first wavy portion is bimodal. The spectrum of the zero-order diffracted light reflected by the second wavy portion may be unimodal.

The color display may be configured such that hash data of data on non-biometric information, biometric information, or a biometric feature value is recorded in the color display.

The color display may be configured such that the part of the surface of the forming mold is the first wavy surface, the other part of the surface of the forming mold includes a second wavy surface including a plurality of multi-level surfaces each having a plurality of levels, and the plurality of multi-level surfaces are arranged with a predetermined period on the second wavy surface, the period of the multi-level surfaces being longer than the period of the first wavy surface and enabling the multi-level surfaces to reflect first-order diffracted light.

According to the color display, the surface of the forming mold includes the first wavy surface and the second wavy surface; thus, it is difficult to counterfeit a color display including the forming mold as compared with the case where the surface of the forming mold includes only the first wavy surface.

The color display may be configured such that an observation angle is defined as an angle formed by a plane in which the color display is located and a plane including a line-of-sight direction of an observer observing the color display, the first wavy surface displays a first motif image observed in a first range of the observation angle, the second wavy surface displays a second motif image observed in a second range of the observation angle, and at least part of the first range is not included in the second range, and at least part of the second range is not included in the first range.

According to the color display, the observation angle of the color display includes the observation angle at which only the first motif is displayed and the observation angle at which only the second motif is displayed. This allows the observer to visually recognize each of the images at a specific observation angle without hindrance by another image.

The color display may be configured such that the second range is not included in the first range of the observation angle, and the color display displays neither the first motif image nor the second motif image in a third range of the observation angle, the third range including the observation angle between the first range and the second range.

According to the color display, when the color display is observed by the observer in the third range of the observation angle, the observer easily perceives a state of the color display other than the first motif image and the second motif image displayed by the color display.

The color display may be configured such that the first motif image is a chromatic image, and the second motif image is an achromatic image. According to the color display, the visual attraction of the color display can be improved as compared with the case where both the first motif image and the second motif image are chromatic images or the case where both the first motif image and the second motif image are achromatic images.

The color display may be configured such that an observation position is defined as a position of a viewpoint of the observer observing the color display, a first position and a second position are defined as positions of the color display with respect to a rotation axis that is a normal line of the plane in which the color display is located, the second position being a position of the color display rotated from the first position by 90° around the rotation axis, the first wavy surface displays the first motif image having a first color to the observation position when the color display is in the first position, and displays the first motif image having a second color to the observation position when the color display is in the second position, the second color being different from the first color, and the second wavy surface displays the second motif image having a first brightness to the observation position when the color display is in the first position, and displays the second motif image having a second brightness to the observation position when the color display is in the second position, the second brightness being different from the first brightness.

According to the color display, the color display can have two states that allow the observer to have different impressions of the first motif image, and two states that allow the observer to have different impressions of the second motif image.

The color display may be configured such that each of the first motif image and the second motif image is a machine-readable code. According to this configuration, the results of machine reading for the first motif image and the results of machine reading for the second motif image can be used to determine authenticity of the color display.

A method of determining authenticity of a color display for solving the above problem is a method of determining authenticity of the color display. The method includes detecting a counterfeit product by visual observation using light reflected by the color display, and using a difference between a spectrum of zero-order diffracted light reflected by the first wavy portion and a spectrum of zero-order diffracted light reflected by the second wavy portion to verify the authenticity based on one or both of the first wavy portion and the second wavy portion distinguished from each other using a verifier.

The method for determining the authenticity of the color display body for solving the above problems is a method for determining the authenticity of the color display body with the step of performing a machine reading of the light reflected by the first wavy surface, and the second method. The method includes machine reading light reflected by the first wavy surface and determining whether the light reflected by the first wavy surface forms the first motif image. A step of determining whether the light reflected by the second wavy surface forms the second motif image, and a step of determining whether the light reflected by the second wavy surface forms the second motif image based on the result of the machine reading of the second wavy surface. When it is determined that the light reflected by the one wavy surface forms the first motif image, and it is determined that the light reflected by the second wavy surface forms the second motif image, the color display is authentic.

According to the authenticity determination method of the color display, it is possible to determine if the color display is genuine based on the results of the machine reading of the light reflected by the first wavy surface and the results of the machine reading of the light reflected by the second wavy surface.

Advantageous Effects of the Invention

The embodiments of the present invention are capable of varying the wavelength of light reflected by the color display due to guided-mode resonance.

BRIEF DESCRIPTION OF THE DRAWINGS

FIGS. 8(a)-8(d) are a set of cross-sectional views illustrating examples of the structure of the color display.

FIGS. 9(a)-9(b) are a set of cross-sectional views illustrating examples of the structure of the color display.

FIGS. 10(a)-10(b) are a set of schematic diagrams illustrating a relationship between an azimuth angle of an uneven surface and a line-of-sight direction of the observer.

FIG. 33 is a schematic diagram illustrating a state in which light reflected by the color display is received by the verifier.

FIGS. 34(a)-34(b) is a set of schematic diagrams illustrating the results of machine reading using the verifier.

DETAILED DESCRIPTION

Figure 1:
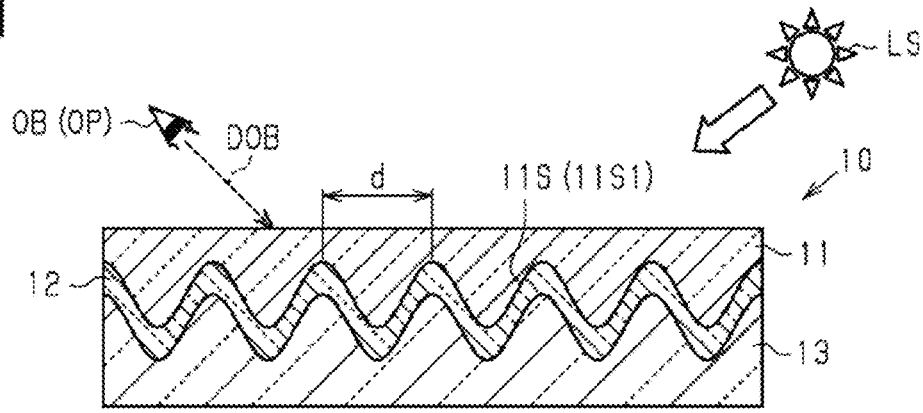
FIG. 1 is a schematic cross-sectional view illustrating the structure of a color display of a first embodiment, together with an observer and a light source.

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

First Embodiment

A first embodiment of a color display, an authentication medium, and a method of determining authenticity of the color display will be described with reference to FIGS. 1 to 20. The structure of the color display, the shape of an uneven surface, an azimuth angle of the uneven surface, functions of the color display, and a method of manufacturing the color display will be described below in this order.

[Structure of Color Display]

The structure of the color display will be described with reference to FIGS. 1 to 7.

As shown in FIG. 1, a color display 10 includes a forming mold (hereafter "embossed layer") 11 made of a resin, a deposited film (hereafter "high refractive index layer") 12 that is a dielectric, and a plastic protector (hereafter "protective layer") 13 made of a resin. In the color display 10, the embossed layer 11, the high refractive index layer 12, and the protective layer 13 are laminated in this order. The layers 11, 12, and 13 are optically transmissive.

The embossed layer 11 has a first refractive index n1, the protective layer 13 has a third refractive index n3, and the high refractive index layer 12 has a second refractive index n2. The second refractive index n2 is higher than both the first refractive index n1 and the third refractive index n3. The first refractive index n1 may be the same as or different from the third refractive index n3. When the first refractive index n1 is different from the third refractive index n3, variable elements that contribute to optical characteristics of the color display 10 can be increased as compared with the case where the first refractive index n1 is the same as the third refractive index n3.

The embossed layer 11 has a surface 11S in contact with the high refractive index layer 12, and at least part of the surface 11S is a first wavy surface (hereafter "first uneven surface") 11S1. In the example shown in FIG. 1, the entire surface 11S is the first uneven surface 11S1. A period d of the first uneven surface 11S1 is in the range of 250 nm or more and 500 nm or less. The first uneven surface 11S1 has concave surfaces and convex surfaces, and a single period of the first uneven surface 11S1 includes a single concave surface and a single convex surface in a direction in which the concave surfaces and the convex surfaces of the first uneven surface 11S1 are arranged, i.e., the horizontal direction of the drawing sheet in the example shown in FIG. 1. The first uneven surface 11S1 has a wave shape in a cross section orthogonal to a plane in which the color display 10 is located, and the wave shape of the first uneven surface 11S1 continues in the depth direction of the drawing sheet.

The high refractive index layer 12 has a thickness that allows the high refractive index layer 12 to conform to the surface 11S of the embossed layer 11. The high refractive index layer 12 has a shape conforming to the surface 11S of the embossed layer 11. The high refractive index layer 12 may have a thickness of several nanometers or more and several tens of nanometers or less. The high refractive index layer 12 has a wave shape conforming to the first uneven surface 11S1 in a cross section orthogonal to the plane in which the color display 10 is located, and the wave shape of the high refractive index layer 12 continues in the depth direction of the drawing sheet.

Light is incident on the color display 10 from a light source LS that is located facing the side of the embossed layer 11 opposite to that facing the high refractive index layer 12. The light source LS may be the sun or an illumination device. The color display 10 is observed by an observer OB from the side of the embossed layer 11 facing away from the high refractive index layer 12. An observation position OP, which is a position of a viewpoint of the observer OB, is an arbitrary position in a space on the side of the embossed layer 11 facing away from the high refractive index layer 12. A line-of-sight direction DOB of the observer OB is a direction in which the observer OB visually recognizes the color display 10 from the observation position OP. In the present embodiment, an observation angle is defined as an angle formed by a plane including the line-of-sight direction DOB and the plane in which the color display 10 is located. The surface of the embossed layer 11 opposite to the surface 11S is substantially flat. That is, the surface of the embossed layer 11 opposite to the surface 11S has flatness high enough to allow the surface to be considered as a flat surface. A specific numerical value of the flatness can be measured in accordance with JIS 0621-1984, and may be less than 10 mm, and further less than 1 mm in a square with a side of 100 mm. When the flatness is 0.1 mm or more, the surface of the embossed layer 11 opposite to the surface 11S can have sufficient flatness. Thus, the observation angle may also be defined as an angle formed by the plane including the line-of-sight direction DOB and the surface of the embossed layer 11 opposite to the surface 11S.

Guided-mode resonance that occurs in the color display 10 will be described with reference to FIGS. 2 and 3.

Figure 2:
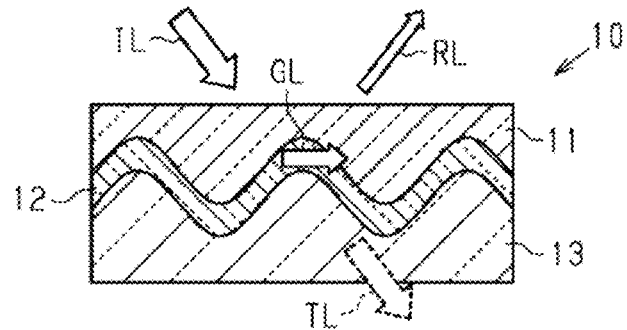
FIG. 2 is a schematic diagram illustrating the behavior of light in the color display shown in FIG. 1.

As shown in FIG. 2, guided-mode resonance occurs in the color display 10 including at least three layers. The occurrence of guided-mode resonance requires the three layers to be configured such that a middle layer located in the middle has the highest refractive index and that the middle layer is located between two layers having a refractive index different from that of the middle layer as described above. That is, in the color display 10, the high refractive index layer 12 is required to be located between the embossed layer 11 and the protective layer 13.

In the color display 10, the high refractive index layer 12 is included in a waveguide layer. A part of incident light IL that is incident on the color display 10 and is diffracted by the high refractive index layer 12 is propagated in the high refractive index layer while being totally reflected at a boundary between the embossed layer 11 and the high refractive index layer 12 and a boundary between the high refractive index layer 12 and the protective layer 13. Such propagation of light occurs due to the fact that the second refractive index n2 of the high refractive index layer 12 is higher than both the first refractive index n1 of the embossed layer 11 and the third refractive index n3 of the protective layer 13. Only part of the incident light IL that has a wavelength satisfying guided light propagation conditions (described below) is propagated as guided light GL in the high refractive index layer 12, and as a result of propagation, the light is reflected in the color display as reflected light RL having high brightness. The reflected light RL is reflected in the direction of specular reflection. On the other hand, light having a wavelength that does not satisfy the propagation conditions exits from the color display 10 as transmitted light TL passing through the color display 10.

Figure 3:
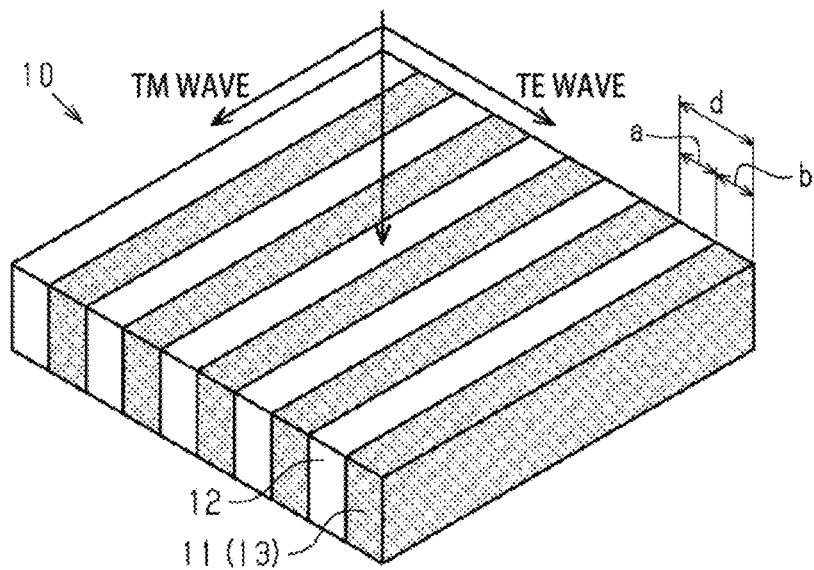
FIG. 3 is a schematic diagram of the color display, illustrating guided-mode resonance.

FIG. 3 is a schematic diagram of the color display 10, illustrating the guided light propagation conditions.

As shown in FIG. 3, the color display 10 has a structure in which portions of the high refractive index layer 12, portions of the embossed layer 11, and portions of the protective layer 13 are alternately arranged in the direction in which the concave surfaces and the convex surfaces of the high refractive index layer 12 are arranged, as viewed in the direction of light propagated in the color display 10. That is, the color display 10 has a structure in which portions having a high refractive index and portions having a low refractive index are alternately arranged in the direction in which the concave surfaces and the convex surfaces are arranged.

The propagation conditions can be represented by the following formulas (1) to (6), using an occupancy ratio F of the high refractive index layer 12 in the period d, a wavelength $\lambda$ of the incident light IL, the period d of the uneven surface, a wave number k, and a reciprocal lattice vector K.

[Math. 1]
$$n_{\mathit{eff\_TE}} = \sqrt{F n_2^2 + (1-F) n_{1 \, or \, 3}^2} \qquad \text{Formula (1)}$$

[Math. 2]
$$n_{\mathit{eff\_TM}} = \cfrac{1}{\sqrt{\cfrac{F}{n_2^2} + \cfrac{(1-F)}{n_{1 \, or \, 3}^2}}} \qquad \text{Formula (2)}$$

[Math. 3]
$$k n_{\mathit{UVresin}} \sin\theta + mK = \beta \qquad \text{Formula (3)}$$

$$k = 2\pi/\lambda \qquad \text{Formula (4)}$$

$$K = 2\pi/d \qquad \text{Formula (5)}$$

$$\beta = (2\pi/\lambda) \cdot n_{\mathit{eff}} \qquad \text{Formula (6)}$$

In the formula (3), the incident angle θ of the incident light IL and the diffraction order m are integers. In the formula (3), the propagation constant β of the waveguide layer, i.e., the high refractive index layer 12, depends on the wavelength λ of the incident light IL and an effective refractive index $n_{\mathit{eff}}$ of the high refractive index layer 12. The formula (1) represents the effective refractive index $n_{\mathit{eff}}$ of the high refractive index layer 12 for a TE wave, and the formula (2) represents the effective refractive index $n_{\mathit{eff}}$ of the high refractive index layer 12 for a TM wave. When the period d of the uneven surface is shorter than the wavelength λ of the incident light IL, the effective refractive index $n_{\mathit{eff}}$ of the high refractive index layer 12 for the TE wave differs from the effective refractive index $n_{\mathit{eff}}$ of the high refractive index layer 12 for the TM wave.

Each of the effective refractive indexes $n_{\mathit{eff}}$ is determined by the occupancy ratio of the high refractive index layer 12 in the period d. In FIG. 3, a represents the width of the high refractive index layer 12, and b represents the width of the embossed layer 11 or the protective layer 13. Thus, the occupancy ratio of the high refractive index layer 12 in the period d is a ratio of the width a to the period d, and the occupancy ratio of the embossed layer 11 or the protective layer 13 in the period d is a ratio of the width b to the period d.

The guided light propagation conditions satisfying the formulas (1) to (6) can be represented by the following formulas.

$$n_{\mathit{eff}} > n1, n3 \qquad \text{Formula (7)}$$

$$\lambda > d \qquad \text{Formula (8)}$$

As described above, the effective refractive index $n_{\mathit{eff}}$ is determined by the occupancy ratio (a/d) of the high refractive index layer 12 in the period d; thus, the following relationship can be derived.

$$n2 > n1, n3 \qquad \text{Formula (9)}$$

The effective refractive index $n_{\mathit{eff}}$ can be used to obtain a wavelength of light guided in the color display 10 and a reflectance of light having the wavelength. That is, adjusting the effective refractive index $n_{\mathit{eff}}$ allows the color display to reflect chromatic light having high brightness using guided-mode resonance.

As is clear from the formulas, the wavelength and the reflectance of the light reflected due to guided-mode resonance can be controlled by changing the parameters included in the formulas from which the effective refractive index $n_{\mathit{eff}}$ and the propagation constant β are derived, i.e., the first refractive index n1, the second refractive index n2, the third refractive index n3, the period d, and the occupancy ratio F. Furthermore, the light reflected due to guided-mode resonance also depends on the angle of the incident light IL incident on the color display. Thus, the color display using guided-mode resonance is suitable for use in making a determination on light reflected by the color display by machine reading of the light.

Further, the larger the difference between the effective refractive index $n_{\mathit{eff}}$ and the first refractive index n1 and between the effective refractive index $n_{\mathit{eff}}$ and the third refractive index n3, the higher the reflectance of the light reflected due to guided-mode resonance. That is, as the occupancy ratio F of the high refractive index layer 12 is increased, the reflectance of the light is increased. Thus, the reflectance of the light is determined according to the difference between the effective refractive index $n_{\mathit{eff}}$ and the first refractive index n1 and the difference between the effective refractive index $n_{\mathit{eff}}$ and the third refractive index n3. Therefore, when a material that can be used to form the embossed layer 11 and the protective layer 13 is fixed, in other words, the refractive indexes of the embossed layer 11 and the protective layer 13 are fixed, it is useful to control the effective refractive index $n_{\mathit{eff}}$ by adjusting the shape of the uneven surface of the embossed layer 11, the thickness of the high refractive index layer 12, and the like, in order to vary the wavelength of the light reflected by the color display.

Figure 4:
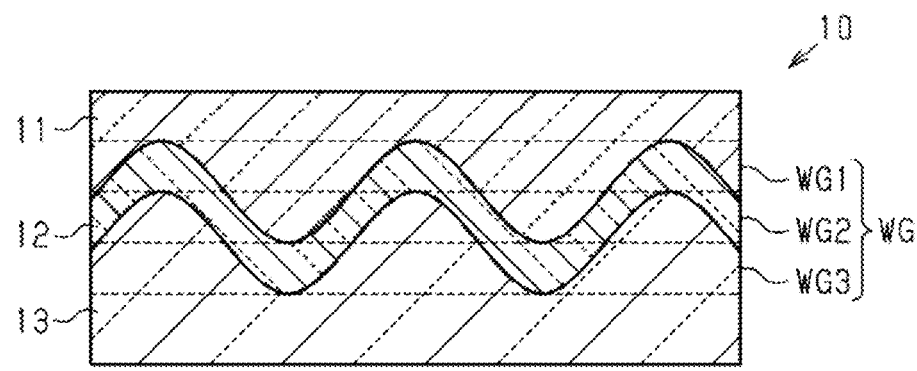
FIG. 4 is a schematic diagram of the color display, illustrating guided-mode resonance.

As shown in FIG. 4, a waveguide layer WG that satisfies the propagation conditions described above is defined by a plane passing through a top portion of the embossed layer 11 and a plane passing through a bottom portion of the protective layer 13. The waveguide layer WG can be divided into three regions in the thickness direction of the color display 10. The waveguide layer WG can be divided into a first waveguide layer WG1, a second waveguide layer WG2, and a third waveguide layer WG3. In the color display, the first waveguide layer WG1 includes parts of the embossed layer 11 and parts of the high refractive index layer 12. The second waveguide layer WG2 includes parts of the embossed layer 11, parts of the high refractive index layer 12, and parts of the protective layer 13. The third waveguide layer WG3 includes parts of the high refractive index layer 12 and parts of the protective layer 13. The parts of the embossed layer 11 included in the first waveguide layer WG1 and the parts of the embossed layer 11 included in the second waveguide layer WG2 are different from each other. The parts of the high refractive index layer 12 included in the first waveguide layer WG1, the parts of the high refractive index layer 12 included in the second waveguide layer WG2, and the parts of the high refractive index layer 12 included in the third waveguide layer WG3 are different from each other. The parts of the protective layer 13 included in the second waveguide layer WG2 and the parts of the protective layer 13 included in the third waveguide layer WG3 are different from each other.

The effective refractive index $n_{\mathit{eff}}$ of the first waveguide layer WG1 is derived from a relationship between the embossed layer 11 and the high refractive index layer 12 in the first waveguide layer WG1. The effective refractive index $n_{\mathit{eff}}$ of the second waveguide layer WG2 is derived from a relationship between the embossed layer 11, the high refractive index layer 12, and the protective layer 13 in the second waveguide layer WG2. The effective refractive index $n_{\mathit{eff}}$ of the third waveguide layer WG3 is derived from a relationship between the high refractive index layer 12 and the protective layer 13 in the third waveguide layer WG3.

The intensity of specular reflection light, i.e., zero-order diffracted light, generated due to guided-mode resonance is obtained by adding the intensity of light reflected by the first waveguide layer WG1, the intensity of light reflected by the second waveguide layer WG2, and the intensity of light reflected by the third waveguide layer WG3. The second waveguide layer WG2 includes both parts of the embossed layer 11 and parts of the protective layer 13 in addition to parts of the high refractive index layer 12. Thus, the occupancy ratio of the high refractive index layer 12 in the second waveguide layer WG2 is lower than both the occupancy ratio of the high refractive index layer 12 in the first waveguide layer WG1 and the occupancy ratio of the high refractive index layer 12 in the third waveguide layer WG3. Therefore, the second waveguide layer WG2 contributes less to the reflectance of the light reflected due to guided-mode resonance than the first waveguide layer WG1 and the third waveguide layer WG3.

Figure 5:
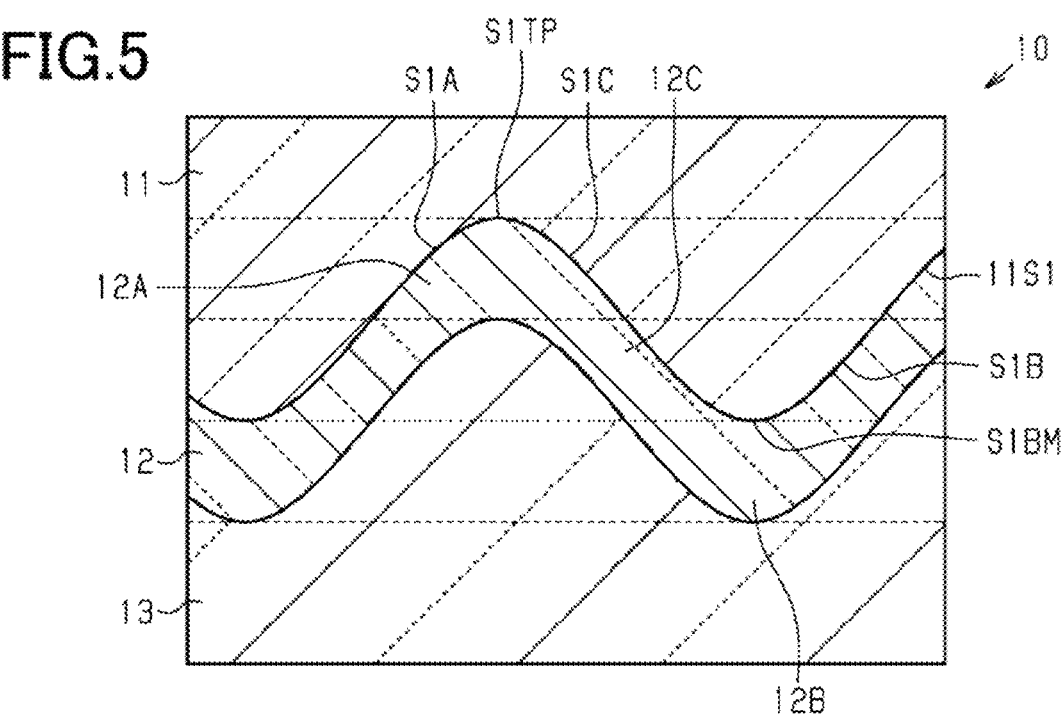
FIG. 5 is an enlarged schematic diagram illustrating a part of the color display shown in FIG. 4.

FIG. 5 is an enlarged view of a part of the cross-sectional structure shown in FIG. 4.

As shown in FIG. 5, the first uneven surface 11S1 includes rib surfaces (hereafter "convex surfaces") S1A, groove surfaces (hereafter "concave surfaces") S1B, and taper surfaces S1C. On the first uneven surface 11S1, the convex surfaces S1A are connected to the respective concave surfaces S1B via the taper surfaces S1C. The convex surfaces S1A each include a different one of top portions S1TP of the first uneven surface 11S1. The concave surfaces S1B each include a different one of bottom portions S1BM of the first uneven surface 11S1. The taper surfaces S1C are neither parallel nor perpendicular to the convex surfaces S1A or the concave surfaces S1B. As shown in FIG. 5, on the first uneven surface 11S1, the convex surfaces S1A are included in the first waveguide layer WG1, the concave surfaces S1B are included in the second waveguide layer WG2, and the taper surfaces S1C extend over the first waveguide layer WG1 and the second waveguide layer WG2.

The high refractive index layer 12 has a peak zone (hereafter "convex portion") 12A in contact with one of the convex surfaces S1A, a valley zone (hereafter "concave portion") 12B in contact with one of the concave surfaces S1B, and a transition zone (hereafter "taper portion") 12C in contact with one of the taper surfaces S1C. As shown in FIG. 5, in the high refractive index layer 12, the convex portion 12A is included in the first waveguide layer WG1, the concave portion 12B extends over the second waveguide layer WG2 and the third waveguide layer WG3, and the taper portion 12C extends over the first waveguide layer WG1 and the second waveguide layer WG2. In the high refractive index layer 12, one of the convex portion 12A, the concave portion 12B, and the taper portion 12C and anther one of the convex portion 12A, the concave portion 12B, and the taper portion 12C are different from each other in at least one of thickness and volume density.

As described above, the color display 10 composed of the embossed layer 11, the high refractive index layer 12, and the protective layer 13 includes the first waveguide layer WG1, the second waveguide layer WG2, and the third waveguide layer WG3. The first waveguide layer WG1 is composed of parts of the embossed layer 11 and parts of the high refractive index layer 12, the second waveguide layer WG2 is composed of parts of the embossed layer 11, parts of the high refractive index layer 12, and parts of the protective layer 13, and the third waveguide layer WG3 is composed of parts of the high refractive index layer 12 and parts of the protective layer 13. In the high refractive index layer 12, the convex portion 12A is mainly included in the first waveguide layer WG1, the concave portion 12B is mainly included in the third waveguide layer WG3, and the taper portion 12C is mainly included in the second waveguide layer WG2. The ratios of the portions of the high refractive index layer 12 in the waveguide layers WG1, WG2, and WG3 contribute to the values of the effective refractive indexes $n_{eff}$ of the waveguide layers WG1, WG2, and WG3, respectively.

The individual effective refractive indexes $n_{eff}$ of the waveguide layers WG1, WG2, and WG3 when at least one of thickness and volume density is uniform in the entire high refractive index layer 12 are used as the respective reference values of the effective refractive indexes $n_{eff}$ of the waveguide layers WG1, WG2, and WG3. In this case, in one or more of the waveguide layers WG1, WG2, and WG3 including a portion in which at least one of the thickness and the volume density is varied, the effective refractive index $n_{eff}$ has a value different from the corresponding reference value. The wavelengths of the reflected light RL derived from the waveguide layers WG1, WG2, and WG3 are determined by the values of the effective refractive indexes $n_{eff}$ of the waveguide layers WG1, WG2, and WG3, respectively. Thus, the wavelengths of the reflected light RL derived from the waveguide layers WG1, WG2, and WG3 can be adjusted by varying at least one of the thickness and the volume density of the high refractive index layer 12. This makes it possible to vary the wavelength of the light reflected by the color display due to guided-mode resonance according to the number or position of portions in which at least one of the thickness and the volume density is varied.

The color display may be configured such that the high refractive index layer 12 includes a plurality of convex portions 12A, a plurality of concave portions 12B, and a plurality of taper portions 12C and that at least one of thickness and volume density is different between at least one of the convex portions 12A and one of the concave portions 12B, or between at least one of the concave portions 12B and one of the taper portions 12C, or between at least one of the taper portions 12C and one of the convex portions 12A. All the plurality of convex portions 12A may be the same in both thickness and volume density, or at least one of the plurality of convex portions 12A may be different from one of the concave portions 12B or one of the taper portions 12C in at least one of thickness and volume density. All the plurality of concave portions 12B may be the same in both thickness and volume density, or at least one of the plurality of concave portions 12B may be different from one of the convex portions 12A or one of the taper portions 12C in at least one of thickness and volume density. All the plurality of taper portions 12C may be the same in both thickness and volume density, or at least one of the plurality of taper portions 12C may be different from one of the convex portions 12A or one of the concave portions 12B in at least one of thickness and volume density.

In the high refractive index layer 12, when the thickness of the high refractive index layer 12 is varied, the occupancy ratios of the high refractive index layer 12 in the waveguide layers WG1, WG2, and WG3 are varied. This causes the effective refractive indexes $n_{eff}$ of the waveguide layers WG1, WG2, and WG3 to be varied. As a result, the wavelengths of the light guided by the waveguide layers WG1, WG2, and WG3 are varied, and thus the wavelength of the reflected light RL reflected by the color display 10 is varied. Therefore, the color of the light reflected by the color display 10 is varied. The occupancy ratios of the high refractive index layer 12 in the waveguide layers WG1, WG2, and WG3 tend to be increased as the thickness of the high refractive index layer 12 is increased. Furthermore, the occupancy ratios of the high refractive index layer 12 in the waveguide layers WG1, WG2, and WG3 tend to be reduced as the thickness of the high refractive index layer 12 is reduced.

Furthermore, by setting the thickness of the convex portions 12A to be greater than both the thickness of the concave portions 12B and the thickness of the taper portions 12C (change 1), the occupancy ratio of the high refractive index layer 12 in the first waveguide layer WG1 can be increased. By setting the thickness of the concave portions 12B to be greater than both the thickness of the convex portions 12A and the thickness of the taper portions 12C (change 2), the occupancy ratio of the high refractive index layer 12 in the third waveguide layer WG3 can be increased. By setting the thickness of the taper portions 12C to be greater than both the thickness of the convex portions 12A and the thickness of the concave portions 12B (change 3), the occupancy ratio of the high refractive index layer 12 in the first waveguide layer WG1 and the second waveguide layer WG2 can be increased. Each of the change 1, the change 2, and the change 3 can be applied alone to the color display 10. In the change 1, the thickness of the taper portions 12C may be set to be greater than the thickness of the concave portions 12B. In the change 2, the thickness of the taper portions 12C may be set to be greater than the thickness of the convex portions 12A.

In the high refractive index layer 12, when the volume density of the high refractive index layer 12 is varied, the refractive index of the high refractive index layer 12 is varied. This causes the effective refractive indexes $n_{eff}$ of the waveguide layers WG1, WG2, and WG3 to be varied even when the occupancy ratios of the high refractive index layer 12 in the waveguide layers WG1, WG2, and WG3 are the same. As a result, the wavelengths of the light guided by the waveguide layers WG1, WG2, and WG3 are varied, and thus the wavelength of the reflected light RL reflected by the color display 10 is varied. Therefore, the color of the light reflected by the color display 10 is varied. The refractive index of the high refractive index layer 12 tends to be increased as the volume density of the high refractive index layer 12 is increased. Furthermore, the refractive index of the high refractive index layer 12 tends to be reduced as the volume density of the high refractive index layer 12 is reduced.

By setting the volume density of the convex portions 12A to be higher than both the volume density of the concave portions 12B and the volume density of the taper portions 12C, the effective refractive index $n_{eff}$ of the first waveguide layer WG1 can be varied. By setting the volume density of the concave portions 12B to be higher than the volume density of the convex portions 12A and the volume density of the taper portions 12C, the effective refractive index $n_{eff}$ of the third waveguide layer WG3 can be varied. By setting the volume density of the taper portions 12C to be higher than both the volume density of the convex portions 12A and the volume density of the concave portions 12B, the effective refractive indexes $n_{eff}$ of the first waveguide layer WG1 and the second waveguide layer WG2 can be varied.

Figure 6:
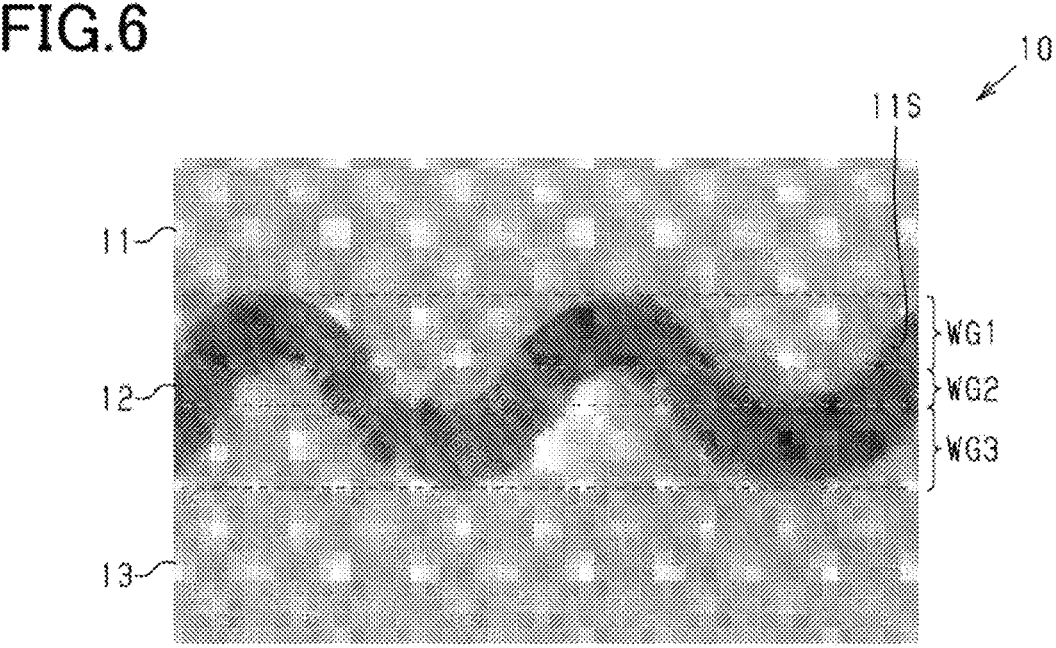
FIG. 6 shows an SEM image obtained by capturing an image of a cross-sectional structure of an example of the color display.
Figure 7:
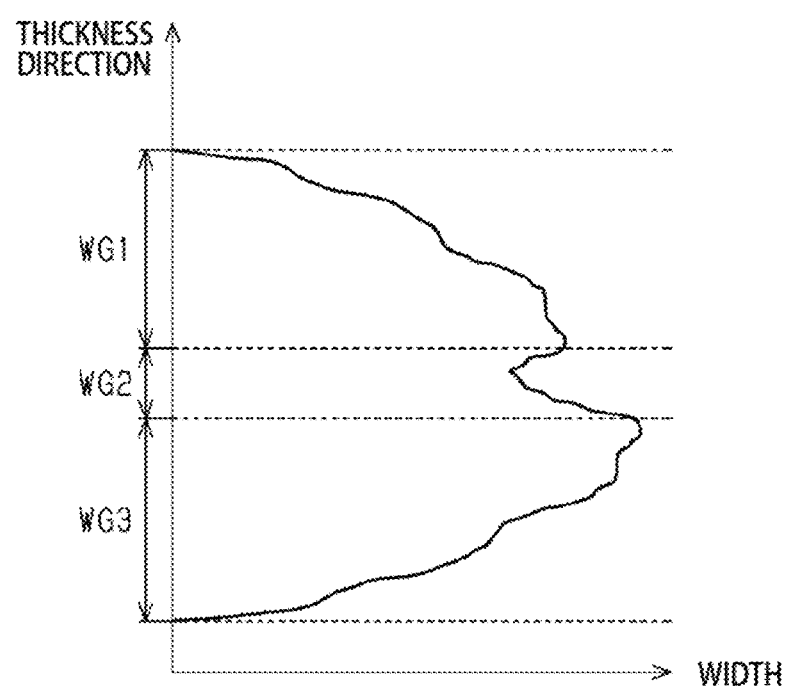
FIG. 7 is a graph showing a relationship between a width of a high refractive index layer and a thickness direction of the color display in the SEM image shown in FIG. 6.

FIG. 6 shows an SEM image obtained by capturing an image of a cross-sectional structure of an example of the color display 10 with a scanning electron microscope (SEM). FIG. 7 is a graph showing a relationship in the high refractive index layer 12 in the SEM image shown in FIG. 6 between the thickness direction of the color display 10 and the width of the high refractive index layer 12. In FIG. 7, the width of the high refractive index layer 12 is the length of the high refractive index layer 12 in the direction in which the concave surfaces and the convex surfaces are arranged. That is, FIG. 7 shows a transition of the width of the high refractive index layer 12 along the thickness of the color display 10. The widths of the high refractive index layer 12 in the waveguide layers WG1, WG2, and WG3 shown in FIG. 7 are the sums of the widths of the portions of the high refractive index layer 12 included in the waveguide layers WG1, WG2, and WG3, respectively. Hereinafter, the sum of the width of the portions of the high refractive index layer 12 included in the first waveguide layer WG1 is referred to as a first sum, the sum of the width of the portions of the high refractive index layer 12 included in the second waveguide layer WG2 is referred to as a second sum, and the sum of the width of the portions of the high refractive index layer 12 included in the third waveguide layer WG3 is referred to as a third sum.

As shown in FIG. 6 and as described above, the color display 10 includes the embossed layer 11, the high refractive index layer 12, and the protective layer 13. The high refractive index layer 12 has a thickness that allows the high refractive index layer 12 to have a shape conforming to the surface 11S of the embossed layer 11. A cross section of the surface 11S of the embossed layer 11 has a substantially sinusoidal shape, and a cross section of the high refractive index layer 12 has a substantially sinusoidal shape as with the surface 11S of the embossed layer 11.

As shown in FIG. 7, the maximum value of the third sum is greater than the maximum value of the first sum. The second sum is equal to the maximum value of the first sum at the boundary between the portions of the high refractive index layer 12 included in the second waveguide layer WG2 and the portions of the high refractive index layer 12 included in the first waveguide layer WG1, and is equal to the maximum value of the third sum at the boundary between the portions of the high refractive index layer 12 included in the second waveguide layer WG2 and the portions of the high refractive index layer 12 included in the third waveguide layer WG3.

The third sum is increased in the direction from the surface that is in contact with the protective layer 13 toward the surface of the embossed layer 11. The first sum is increased in the direction from the surface of the high refractive index layer 12 that is in contact with the embossed layer 11 toward the surface of the high refractive index layer 12 that is in contact with the protective layer 13. The second sum has the minimal value substantially in the middle between the surface of the high refractive index layer 12 that is in contact with the embossed layer 11 and the surface of the high refractive index layer 12 that is in contact with the protective layer 13.

In the example shown in FIG. 6, on the surface 11S of the embossed layer 11, the concave surfaces S1B have a width greater than that of the convex surfaces S1A. Thus, the maximum value of the third sum is greater than the maximum value of the first sum.

[Shape of Uneven Surface]

The shape of the first uneven surface 11S1 of the embossed layer 11 will be described with reference to FIGS. 8 and 9.

FIGS. 8a-8d shows examples of a cross-sectional shape of the color display 10.

In a color display 10A shown in FIG. 8(a), the first uneven surface 11S1 has a wave shape. On the first uneven surface 11S1, a convex surface width WA1 is the width of each of the convex surfaces S1A, and a concave surface width WB1 is the width of each of the concave surfaces S1B. The convex surface width WA1 is equal to the concave surface width WB1. A height H1 of the first uneven surface 11S1 is a distance between the top portion S1TP and the bottom portion S1BM of the first uneven surface 11S1 in the thickness direction of the color display 10. A thickness T of the high refractive index layer 12 is substantially uniform in the entire high refractive index layer 12.

In a color display 10B shown in FIG. 8(b), the convex surface width WA1 is equal to the concave surface width WB1 as in the color display 10A. In the color display 10B, the first uneven surface 11S1 has a height H2 greater than the height H1 of the first uneven surface 11S1 in the color display 10A. In the color display 10B, the second waveguide layer WG2 has a greater thickness than in the color display 10A. This increases the occupancy ratio of the waveguide layer in the thickness direction of the color display 10B. In the second waveguide layer WG2, the occupancy ratio of the embossed layer 11 and the protective layer 13 is increased, and the occupancy ratio of the high refractive index layer 12 is reduced. Thus, the effective refractive index $n_{eff}$ of the color display 10B is lower than the effective refractive index $n_{eff}$ of the color display 10A.

The first uneven surface 11S1 of the color display 10 may have a first wavy portion (hereafter "first uneven portion"). As described above, the height of the first uneven surface 11S1 is a distance between the top portion S1TP of a convex surface S1A and the bottom portion S1BM of a concave surface S1B adjacent to the convex surface S1A. In the first uneven portion, the height of the first uneven surface 11S1 may have a first value and a second value different from the first value. For example, the first uneven portion may have a single surface 11S including both the first uneven surface 11S1 of the color display 10A and the first uneven surface 11S1 of the color display 10B. Thus, a part of the first uneven portion in which the height of the first uneven surface 11S1 has the first value and a part of the first uneven portion in which the height of the first uneven surface 11S1 has the second value have different effective refractive indexes $n_{eff}$ of the waveguide layer. This enables the first uneven portion to reflect light having a different wavelength from light reflected by the first uneven portion having a uniform effective refractive index $n_{eff}$.

In a color display 10C shown in FIG. 8(c), the height H1 of the first uneven surface 11S1 is equal to the height H1 of the first uneven surface 11S1 in the color display 10A. In the color display 10C, a convex surface width WA2 is less than the convex surface width WA1 in the color display 10A. In the color display 10C, a concave surface width WB2 is less than the concave surface width WB1 in the color display 10A, and the concave surface width WB2 is equal to the convex surface width WA2. With this configuration, the waveguide layers WG1, WG2, and WG3 of the color display 10C include portions of the high refractive index layer 12 at a higher frequency. Thus, the effective refractive index $n_{eff}$ of the waveguide layer WG in the color display 10C is higher than the effective refractive index $n_{eff}$ of the waveguide layer WG in the color display 10A.

The first uneven surface 11S1 of the color display 10 may have a second wavy portion (hereafter "second uneven portion"). The second uneven portion may have the convex surfaces S1A having a first width and the concave surfaces S1B having a second width different from the first width in the direction in which the convex surfaces S1A and the concave surfaces S1B are arranged. For example, the second uneven portion may have the convex surfaces S1A of the first uneven surface 11S1 of the color display 10A and the concave surfaces S1B of the first uneven surface 11S of the color display 10C. Alternatively, the second uneven portion may have the concave surfaces S1B of the first uneven surface 11S1 of the color display 10A and the convex surfaces S1A of the first uneven surface 11S1 of the color display 10C. This allows the second uneven portion to have the convex surfaces S1A having the first width and the concave surfaces S1B having the second width.

By setting the width of the convex surfaces S1A to be different from the width of the concave surfaces S1B in the second uneven portion, the second uneven portion has a different effective refractive index $n_{eff}$ from the second uneven portion in which the convex surfaces S1A and the concave surfaces S1B have the same width. This enables the second uneven portion to reflect light having a different wavelength from light reflected by the second uneven portion in which the convex surfaces S1A and the concave surfaces S1B have the same width.

When the first refractive index n1 of the embossed layer 11 is higher than the third refractive index n3 of the protective layer 13, the convex surfaces S1A may have a width greater than that of the concave surfaces S1B in the direction in which the convex surfaces S1A and the concave surfaces S1B are arranged. In the high refractive index layer 12, the convex portions 12A in contact with the convex surfaces S1A mainly contribute to the value of the effective refractive index neff of the first waveguide layer WG1, and the concave portions 12B in contact with the concave surfaces S1B mainly contribute to the value of the effective refractive index $n_{eff}$ of the third waveguide layer WG3. When the convex surfaces S1A have a width greater than that of the concave surfaces S1B, the occupancy ratio of the high refractive index layer 12 in the first waveguide layer WG1 is higher than the occupancy ratio of the high refractive index layer 12 in the third waveguide layer WG3 as compared with the case where the convex surfaces S1A and the concave surfaces S1B have the same width. Thus, the difference between the effective refractive index $n_{eff}$ of the first waveguide layer WG1 and the effective refractive index $n_{eff}$ of the third waveguide layer WG3 is larger than the difference between the first refractive index n1 and the third refractive index n3. This enables the difference between the wavelength of the light guided by the first waveguide layer WG1 and the wavelength of the light guided by the third waveguide layer WG3 to be larger than the difference between the first refractive index n1 and the third refractive index n3.

The embossed layer 11 may have a lower elastic modulus than the protective layer 13 in order to ensure the moldability of the embossed layer 11. In such a case, by setting the width of the convex surfaces S1A to be greater than the width of the concave surfaces S1B in the direction in which the convex surfaces S1A and the concave surfaces S1B are arranged, the convex surfaces S1A can have a smaller curvature than the concave surfaces S1B. This prevents concentration of stress on the convex surfaces S1A, thus preventing the high refractive index layer 12 from peeling off from the embossed layer 11. As described above, the protective layer 13 has a higher elastic modulus than the embossed layer 11; thus, concentration of stress on the protective layer 13 is less likely to occur due to the elastic modulus of the protective layer 13. Therefore, the protective layer 13 and the high refractive index layer 12 are less likely to peel away from each other.

In a color display 10D shown in FIG. 8(d), the first uneven surface 11S1 has a wave shape. However, in this structure, as in the structure shown in FIG. 6, a width WA3 of the convex surfaces S1A is less than a width WB3 of the concave surfaces S1B in the direction in which the convex surfaces S1A and the concave surfaces S1B are arranged. With this configuration, the concave surfaces S1B have a smaller curvature than the convex surfaces S1A. In this case, in the high refractive index layer 12, the concave portions 12B conforming to the concave surfaces S1B are more likely to have a greater thickness than the convex portions 12A conforming to the convex surfaces S1A due to the method of forming the embossed layer 11 and the high refractive index layer 12 of the color display 10D. More specifically, when the high refractive index layer 12 is formed on the embossed layer 11, for example, by vacuum deposition, particles are more likely to be deposited on the concave surfaces S1B having a relatively small curvature, and particles are less likely to be deposited on the convex surfaces S1A having a relatively large curvature. Thus, the concave portions 12B are more likely to have a greater thickness than the convex portions 12A. Furthermore, in the case where the concave surfaces S1B have a smaller curvature than the convex surfaces S1A, the concave surfaces S1B that are less likely to be filled with a resin during embossing have a large curvature, and thus the embossed layer 11 is easily formed.

When the first refractive index n1 of the embossed layer 11 is lower than the third refractive index n3 of the protective layer 13, the convex surfaces S1A may have a width less than that of the concave surfaces S1B in the direction in which the convex surfaces S1A and the concave surfaces S1B are arranged. When the convex surfaces S1A have a width less than that of the concave surfaces S1B in the high refractive index layer 12, the occupancy ratio of the high refractive index layer 12 in the first waveguide layer WG1 is higher than the occupancy ratio of the high refractive index layer 12 in the third waveguide layer WG3 as compared with the case where the convex surfaces S1A and the concave surfaces S1B have the same width. Thus, the difference between the effective refractive index $n_{eff}$ of the first waveguide layer WG1 and the effective refractive index $n_{eff}$ of the third waveguide layer WG3 is larger than the difference between the first refractive index n1 and the third refractive index n3. This enables the difference between the wavelength of the light guided by the first waveguide layer WG1 and the wavelength of the light guided by the third waveguide layer WG3 to be larger than the difference between the first refractive index n1 and the third refractive index n3.

FIGS. 9(a)-9(b) shows structures of the cross-sectional shape of the color display 10. FIGS. 8a-8d referred to above shows, as examples, the two color displays 10A and 10B different from each other in the height of the first uneven surface 11S1 and the color displays 10A and 10C different from each other in the convex surface width and the concave surface width. On the other hand, FIGS. 9(a)-9(b) referred to below shows color displays different from each other in the shape of the concave surfaces and the shape of the convex surfaces.

As shown in FIG. 9(a), the first uneven surface 11S1 includes a plurality of convex surfaces S1A, a plurality of concave surfaces S1B, and a plurality of taper surfaces S1C. A convex surface S1A is connected to a concave surface S1B adjacent to the convex surface S1A via a taper surface S1C in the direction in which the convex surfaces S1A and the concave surfaces S1B are alternately arranged. On the first uneven surface 11S1, a convex surface S1A, a taper surface S1C, a concave surface S1B, and a taper surface S1C are arranged in this order. On the first uneven surface 11S1, a group of surfaces composed of a convex surface S1A, a taper surface S1C, a concave surface S1B, and a taper surface S1C is repeated in a single direction. On the first uneven surface 11S1, the convex surfaces S1A are closer to the surface of the embossed layer 11 opposite to the first uneven surface 11S1 than the concave surfaces S1B and taper surfaces S1C are, and the concave surfaces S1B are farther from the surface of the embossed layer 11 opposite to the first uneven surface 11S1 than the convex surfaces S1A and taper surfaces S1C are.

In a color display 10E shown in FIG. 9(a), the convex surfaces S1A have the same shape as the concave surfaces S1B. The convex surfaces S1A and the concave surfaces S1B are each a developable surface (developed curved surface). A developable surface is a curved surface formed by moving a straight line. On a developable surface, the Gaussian curvature is 0 at every point on the developable surface. In this example, the convex surfaces S1A and the concave surfaces S1B have a substantially semicircular shape and are composed of a plurality of straight lines in a cross section orthogonal to a plane in which the color display 10E is located and orthogonal to a direction in which the convex surfaces S1A extend. Thus, the design and manufacture of the color display 10E are easy as compared with the case where the convex surfaces S1A and the concave surfaces S1B are double-curved surfaces. A double-curved surface is a curved surface having no linear component.

The taper surfaces S1C each have a linear approximation curve shape in a cross section orthogonal to the plane in which the color display 10E is located and orthogonal to the direction in which the convex surfaces S1A extend. The taper surfaces S1C are neither parallel nor perpendicular to the convex surfaces S1A or the concave surfaces S1B. Although the taper surfaces S1C are taper surfaces in this example, the taper surfaces S1C may be reverse taper surfaces. The first uneven surface 11S1 has the taper surfaces S1C as surfaces connecting the convex surfaces S1A to the respective concave surfaces S1B; thus, the shape accuracy of the first uneven surface 11S1 is high as compared with the case where the first uneven surface 11S1 has, instead of the taper surfaces S1C, surfaces orthogonal to the plane in which the color display 10E is located. More specifically, during the formation of the embossed layer 11 using an original plate, a resin molded using the original plate is easily separated from the original plate.

In a color display 10F shown in FIG. 9(b), the convex surfaces S1A have the same shape as the concave surfaces S1B. The convex surfaces S1A and the concave surfaces S1B each have a linear shape in a cross section orthogonal to a plane in which the color display 10F is located and orthogonal to a direction in which the convex surfaces S1A extend. The convex surfaces S1A and the concave surfaces S1B are substantially parallel to the surface of the embossed layer 11 opposite to the first uneven surface 11S1. The taper surfaces S1C each have a linear approximation curve shape in a cross section orthogonal to the plane in which the color display 10F is located and orthogonal to the direction in which the convex surfaces S1A extend. Although the taper surfaces S1C are taper surfaces in this example, the taper surfaces S1C may be reverse taper surfaces.

In the color display 10, the convex surfaces S1A may have a shape different from that of the concave surfaces S1B. For example, the color display 10 may have the convex surfaces S1A of the color display 10E and the concave surfaces S1B of the color display 10F. Alternatively, the color display 10 may have the concave surfaces S1B of the color display 10E and the convex surfaces S1A of the color display 10F. Alternatively, the color display 10 may have two types of convex surfaces S1A and two types of concave surfaces S1B.

[Azimuth Angle of Uneven Surface]

An azimuth angle of the first uneven surface 11S1 will be described with reference to FIGS. 10 to 13.

FIGS. 10(a)-10(b) shows a relationship between the line-of-sight direction DOB of the observer OB and the azimuth angle of the first uneven surface 11S1. The convex surfaces S1A extend in the direction in which the straight-line segments shown in the color display 10 in FIGS. 10(a)-10(b) extend.

As shown in FIG. 10(a), the convex surfaces S1A of the color display 10 extend in a single direction. In the example shown in FIG. 10(a), the convex surfaces S1A extend in the vertical direction of the drawing sheet. The azimuth angle of the first uneven surface 11S1 is an angle formed by the direction in which the convex surfaces S1A extend and a reference direction which is an arbitrary direction along the plane in which the color display 10 is located. In this example, the reference direction is set to the horizontal direction of the drawing sheet. In this case, the angle formed by the reference direction and the direction in which the convex surfaces S1A extend is 90°. Thus, the azimuth angle of the first uneven surface 11S1 is 90°. A projection direction in which the line-of-sight direction DOB of the observer OB is projected onto the plane in which the color display 10 is located is the vertical direction of the drawing sheet. The projection direction is parallel to the direction in which the convex surfaces S1A extend. That is, the first uneven surface 11S1 is longitudinally oriented with respect to the observer OB.

In the example shown in FIG. 10(b), the convex surfaces S1A extend in the horizontal direction of the drawing sheet. Since the reference direction is the horizontal direction of the drawing sheet, the angle formed by the reference direction and the direction in which the convex surfaces S1A extend is 0°. Thus, the azimuth angle of the first uneven surface 11S1 is 0°. A projection direction in which the line-of-sight direction DOB of the observer OB is projected onto the plane in which the color display 10 is located is the vertical direction of the drawing sheet. The projection direction is orthogonal to the direction in which the convex surfaces S1A extend. That is, the first uneven surface 11S1 is laterally oriented with respect to the observer OB.

Figure 11:
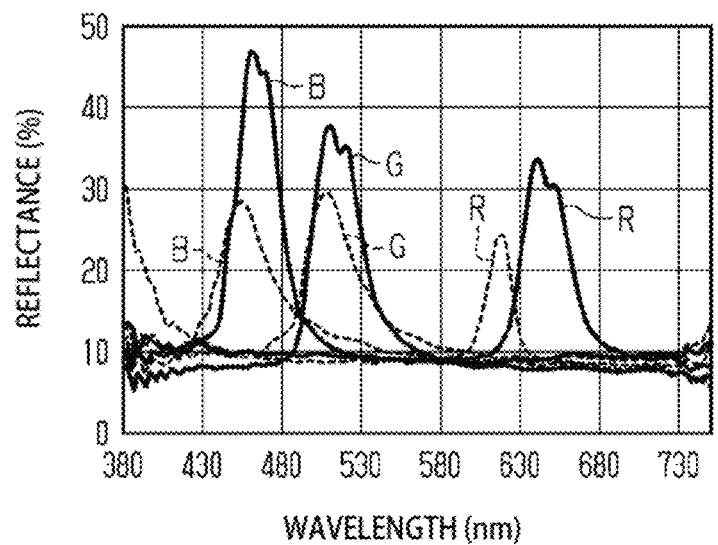
FIG. 11 is a graph showing a relationship between the azimuth angle of the uneven surface and a reflectance of light having a predetermined wavelength.

FIG. 11 shows a relationship between a wavelength and a reflectance of the reflected light RL reflected by the color display 10. In FIG. 11, the spectra indicated by the solid line are spectra obtained with the color display 10 in which the first uneven surface 11S1 is longitudinally oriented, and the spectra indicated by the dashed line are spectra obtained with the color display 10 in which the first uneven surface 11S1 is laterally oriented. When the spectrum of the reflected light RL is obtained, a measurement direction is set to a direction from a light receiving element of a measuring device toward the color display 10, and the measurement direction is regarded as the line-of-sight direction DOB.

As shown in FIG. 11, the color display 10 in which the first uneven surface 11S1 is longitudinally oriented and the color display 10 in which the first uneven surface 11S1 is laterally oriented both can reflect red light indicated by a spectrum R, green light indicated by a spectrum G, and blue light indicated by a spectrum B. However, for all the spectra R, G, and B, the spectra R, G, and B indicated by the solid line respectively have a higher peak strength than the spectra R, G, and B indicated by the dashed line. Thus, the color display 10 is preferably configured such that the first uneven surface 11S1 is longitudinally oriented with respect to the observer OB. In other words, the color display 10 is preferably configured to be able to display a predetermined image when the first uneven surface 11S1 is longitudinally oriented with respect to the observer OB. The predetermined image can be displayed by motifs formed using a difference in structures of the color display 10, that is, motifs composed of a plurality of different structures. In other words, motifs can be formed using a difference in structures of the color display 10, and the motifs can display images. The predetermined image enables detection of a counterfeit product of the color display 10. That is, the color display 10 may have a plurality of different regions having different structures.

Figure 12:
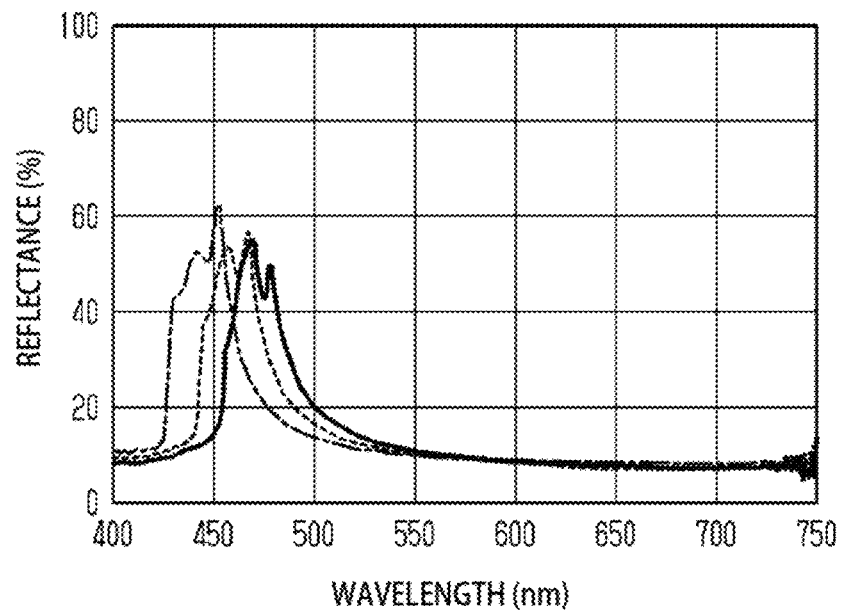
FIG. 12 is a graph showing a relationship between a tilt of the color display and the reflectance.
Figure 13:
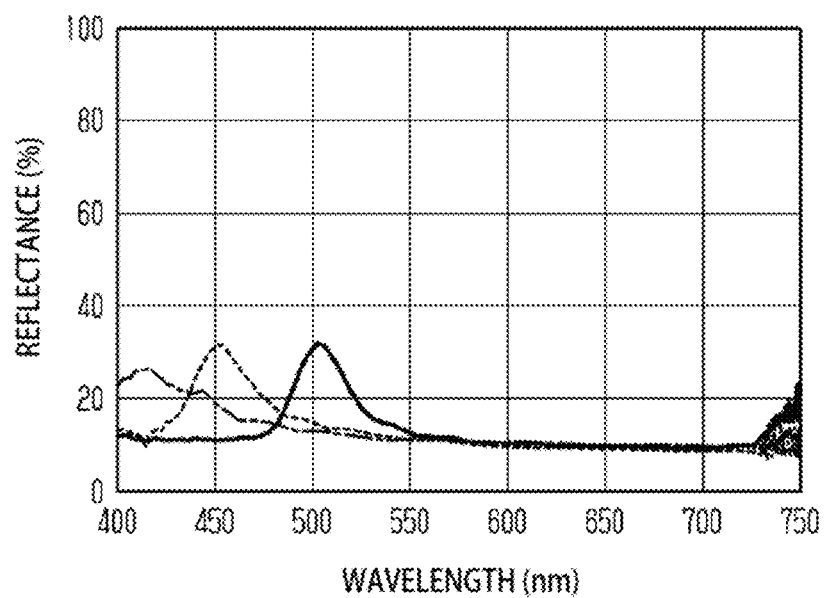
FIG. 13 is a graph showing a relationship between the tilt of the color display and the reflectance.

As in FIG. 11, FIGS. 12 and 13 show a relationship between the wavelength and the reflectance of the reflected light RL reflected by the color display 10. In both FIGS. 12 and 13, the solid line indicates a spectrum of the reflected light RL when the color display 10 is tilted by 20° with respect to a reference position, the dashed line indicates a spectrum of the reflected light RL when the color display 10 is tilted by 30° with respect to the reference position, and the dot-dashed line indicates a spectrum of the reflected light RL when the color display 10 is tilted by 40° with respect to the reference position. The reference position is a position of the color display 10 when the color display 10 is located on the horizontal plane. FIG. 12 shows the spectra obtained with the color display 10 in which the first uneven surface 11S1 is longitudinally oriented. On the other hand, FIG. 13 shows the spectra obtained with the color display 10 in which the first uneven surface 11S1 is laterally oriented.

As shown in FIG. 12, in the case of the color display 10 in which the first uneven surface 11S1 is longitudinally oriented, there is a difference of less than 50 nm in the wavelength at the peak between the color display 10 tilted by 20° with respect to the reference position and the color display 10 tilted by 40° with respect to the reference position.

On the other hand, as shown in FIG. 13, in the case of the color display 10 in which the first uneven surface 11S1 is laterally oriented, there is a difference of 50 nm or more and less than 100 nm in the wavelength at the peak between the color display 10 tilted by 20° with respect to the reference position and the color display 10 tilted by 40° with respect to the reference position.

Thus, the color display 10 is preferably configured such that the first uneven surface 11S1 is longitudinally oriented with respect to the observer OB in order to reduce the change in color of the reflected light RL reflected by the color display 10 when the color display 10 is tilted with respect to the reference position. In other words, the color display 10 is preferably configured to be able to display a predetermined image when the first uneven surface 11S1 is longitudinally oriented with respect to the observer OB.

In some cases, the reflected light RL reflected by the color display 10 includes first-order diffracted light. First-order diffracted light is reflected along a plane orthogonal to the direction in which the convex surfaces S1A extend and orthogonal to the plane in which the color display 10 is located. Thus, when the first uneven surface 11S1 of the color display 10 is laterally oriented with respect to the observer OB, the observer OB may visually recognize first-order diffracted light reflected by the color display 10. The observer OB may visually perceive first-order diffracted light and erroneously recognize the first-order diffracted light as zero-order diffracted light, i.e., the reflected light RL generated due to guided-mode resonance. When the first uneven surface 11S1 of the color display 10 is longitudinally oriented with respect to the observer OB, the observer OB is less likely to erroneously recognize first-order diffracted light as zero-order diffracted light.

[Functions of Color Display]

Functions of the color display 10 will be described with reference to FIGS. 14 to 19.

Figure 14:
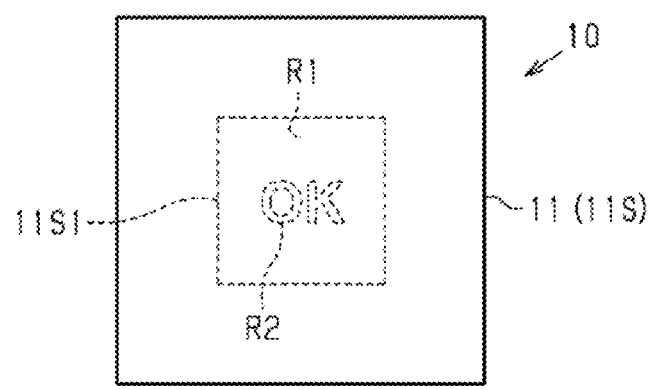
FIG. 14 is a plan view illustrating the color display.

As shown in FIG. 14, the first uneven surface 11S1 is a part of the surface 11S of the embossed layer 11. In this example, the first uneven surface 11S1 is a region including a center portion of the surface 11S. In this example, the first refractive index n1 of the embossed layer 11 is equal to the third refractive index n3 of the protective layer 13. The first uneven surface 11S1 is composed of a first region R1 and a second region R2. The second region R2 is composed of a region having a shape of the alphabet character "O" and a region having a shape of the alphabet character "K". The first region R1 has a shape surrounding the second region R2.

A period of the uneven surface in the first region R1 is equal to a period of the uneven surface in the second region R2. The effective refractive index $n_{eff}$ of the first waveguide layer WG1 in the first region R1 is equal to the effective refractive index $n_{eff}$ of the third waveguide layer WG3 in the first region R1 and the effective refractive index $n_{eff}$ of the first waveguide layer WG1 in the second region R2. On the other hand, the effective refractive index $n_{eff}$ of the first waveguide layer WG1 in the first region R1 differs from the effective refractive index $n_{eff}$ of the third waveguide layer WG3 in the second region R2. The change 1, the change 2, and the change 3 described above can increase the occupancy ratios of the high refractive index layer 12 in the first waveguide layers WG1 and the second waveguide layers WG2 in the first region R1 and the second region R2. This can increase the effective refractive indexes of the first waveguide layer WG1 and the second waveguide layer WG2. A spectrum of zero-order diffracted light reflected by the first region R1 may be unimodal. A spectrum of zero-order diffracted light reflected by the first region R1 may be bimodal.

Figure 15:
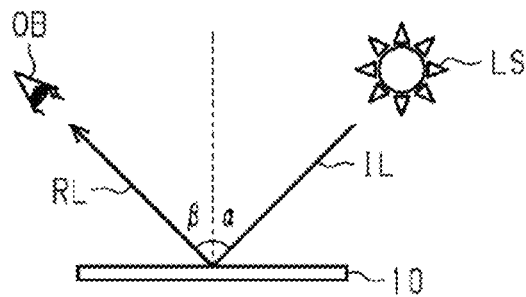
FIG. 15 is a schematic diagram illustrating a state in which the observer observes the color display.

As shown in FIG. 15, when the observer OB observes the color display 10, the observer OB can observe zero-order diffracted light reflected due to guided-mode resonance in the direction of specular reflection. An incident angle α of the incident light IL is equal to a reflection angle β of the zero-order diffracted light which is the reflected light RL. The reflected light RL has a wavelength in the visible light range, and thus the color display 10 can display a chromatic image.

Figure 16:
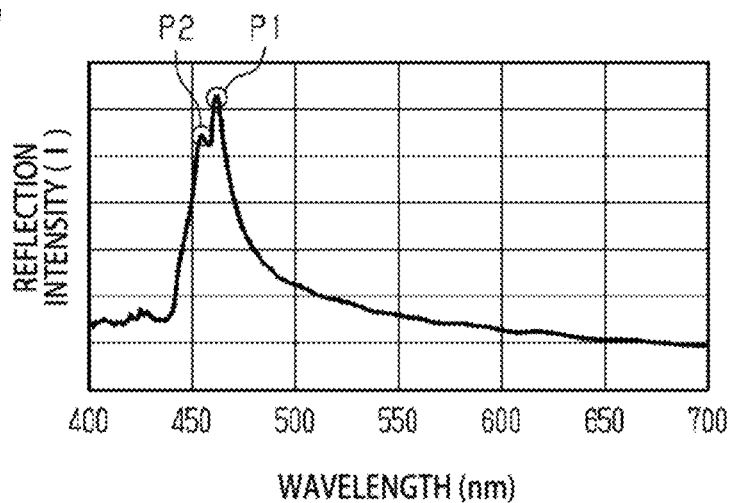
FIG. 16 shows a first example of a spectrum of zero-order diffracted light reflected by the color display.

FIG. 16 shows an example of a spectrum of zero-order diffracted light reflected by the color display 10.

As shown in FIG. 16, the spectrum of the zero-order diffracted light reflected by the color display 10 may be bimodal. A first peak P1 is a peak at which the spectrum of the zero-order diffracted light has the highest reflection intensity, and a second peak P2 is a peak at which the spectrum of the zero-order diffracted light has the second highest reflection intensity. The spectrum of the zero-order diffracted light has the first peak P1 at a wavelength of approximately 470 nm, and has the second peak P2 at a wavelength of approximately 460 nm. The first peak P1 is a peak derived from the reflected light RL reflected by guiding in each of the first waveguide layer WG1 in the first region R1, the third waveguide layer WG3 in the first region R1, and the first waveguide layer WG1 in the second region R2. On the other hand, the second peak P2 is a peak derived from the reflected light RL reflected by guiding in the third waveguide layer WG3 in the second region R2. In this case, the effective refractive index $n_{eff}$ of the first waveguide layer WG1 differs from the effective refractive index $n_{eff}$ of the third waveguide layer WG3.

Although the spectrum of the zero-order diffracted light has the two peaks P1 and P2, the difference in the wavelength between the peaks is approximately 10 nm. Therefore, the observer OB of the color display 10 cannot distinguish the reflected light RL reflected by the color display 10 into the reflected light RL corresponding to the first peak P1 and the reflected light RL corresponding to the second peak P2. The observer OB observing the color display 10 thus visually recognizes a single image having a single chromatic color.

Figure 17:
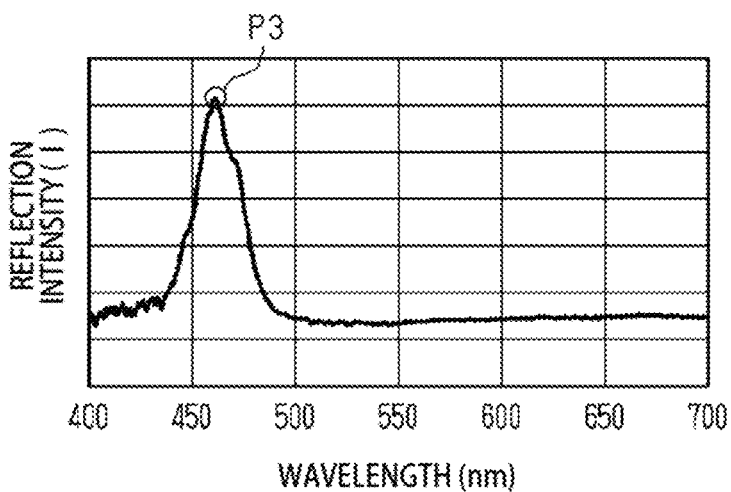
FIG. 17 shows a second example of a spectrum of zero-order diffracted light reflected by the color display.

FIG. 17 shows a spectrum of zero-order diffracted light reflected by another color display.

As shown in FIG. 17, the spectrum of the zero-order diffracted light reflected by the color display may be unimodal. The spectrum has a third peak P3 at a wavelength of approximately 470 nm, and has no other peaks. In the color display that reflects zero-order diffracted light having the spectrum shown in FIG. 17, the reflected light RL reflected by guiding in the first waveguide layer WG1, the reflected light RL reflected by guiding in the second waveguide layer WG2, and the reflected light RL reflected by guiding in the third waveguide layer WG3 have the same wavelength. In this case, the effective refractive index $n_{eff}$ of the first waveguide layer WG1 is equal to the effective refractive index $n_{eff}$ of the third waveguide layer WG3.

Thus, the color display may have a structure capable of reflecting zero-order diffracted light having a multimodal spectrum, or may have a structure capable of reflecting zero-order diffracted light having a unimodal spectrum.

Figure 18:
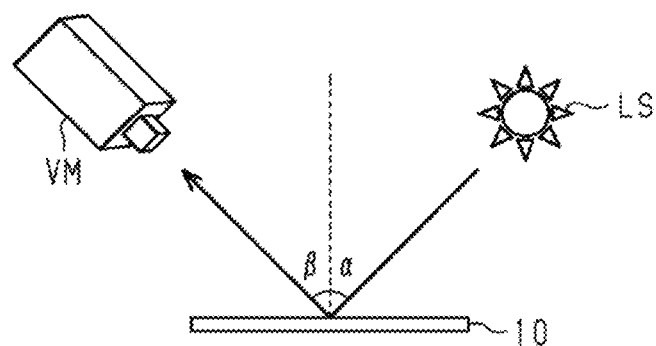
FIG. 18 is a schematic diagram illustrating a state in which zero-order diffracted light reflected by the color display is received by a verifier.

As shown in FIG. 18, a verifier VM may be used to verify the authenticity of the color display 10. As described above, zero-order diffracted light is reflected in the direction of specular reflection. Thus, when the verifier VM is used, the color display 10 and the verifier VM are positioned so that the verifier VM can receive specular reflection light from the color display 10.

Figure 19:
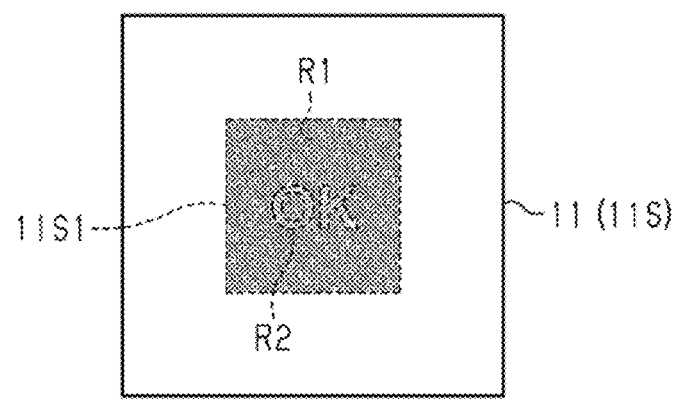
FIG. 19 is a plan view illustrating an image formed by light received by the verifier.

FIG. 19 shows an image formed by light received by the verifier VM.

As shown in FIG. 19, the verifier VM can distinguish between the reflected light RL corresponding to the first peak P1 and the reflected light RL corresponding to the second peak P2. Thus, the first region R1 is distinguished from the second region R2 in an image obtained by the verifier VM. Alternatively, the verifier VM may be configured to be able to detect light reflected by the first region R1 but unable to detect light reflected by the second region R2. In this case as well, the first region R1 is distinguished from the second region R2 in an image obtained by the verifier VM.

Thus, the color display 10 can prevent an observer from distinguishing between the first region R1 and the second region R2 of the color display 10 by visual observation, but allow the observer to distinguish between the first region R1 and the second region R2 using the verifier VM. The authenticity of the color display 10 can be verified based on one or both of the first region R1 and the second region R2 distinguished from each other using the verifier VM. Furthermore, the color development of the color display 10 enables detection of a counterfeit product of the color display 10 by visual observation. Thus, the authenticity of the color display 10 can be determined by visual observation and using the verifier VM. Therefore, the color display 10 can be used to prevent counterfeiting of an article to which the color display 10 is affixed.

In the color display 10 of the present embodiment, one of the convex portion 12A, the concave portion 12B, and the taper portion 12C of the high refractive index layer 12 and another one of the convex portion 12A, the concave portion 12B, and the taper portion 12C can be different from each other in thickness and volume density. This allows the first waveguide layer WG1, the second waveguide layer WG2, and the third waveguide layer WG3 to have the same effective refractive index $n_{eff}$ or different effective refractive indexes $n_{eff}$. This makes it possible to control light reflected by the color display 10, in other words, an image displayed by the color display 10 so that the entire image exhibits a single color corresponding to the effective refractive index $n_{eff}$ or that a part of the image exhibits a different color from another part of the image. Thus, the color display 10 can increase the variation in color of the light reflected by the color display 10 according to the intended use of the color display 10, the environment in which the color display 10 is used, and the expected function of the color display 10.

[Method of Manufacturing Color Display]

A method of manufacturing the color display 10 will be described with reference to FIG. 20.

Figure 20:
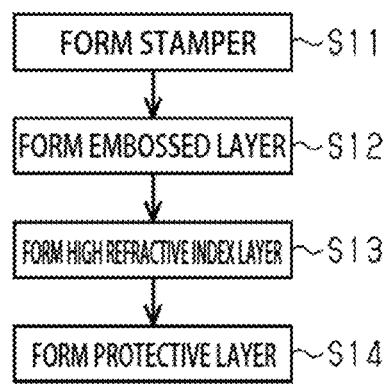
FIG. 20 is a flowchart showing a procedure for manufacturing the color display.

As shown in FIG. 20, the method of manufacturing the color display 10 includes a step of forming a stamper (step S11), a step of forming the embossed layer 11 (step S12), a step of forming the high refractive index layer 12 (step S13), and a step of forming the protective layer 13 (step S14).

In the step of forming a stamper, first, an original plate is formed by electron beam lithography. In order to form the original plate, first, a positive resist material is prepared. Next, the resist material is used to form a resist layer. Then, the resist layer is irradiated with an electron beam according to the shape of the surface 11S of the embossed layer 11. Since the resist layer is formed using a positive resist, a portion of the resist layer to be removed after development is irradiated with an electron beam.

In the case where a positive resist material is used, the portion of the resist layer irradiated with an electron beam is removed after development. Thus, after development, the portion of the resist layer irradiated with an electron beam has lower flatness than a portion of the resist layer that has not been irradiated with an electron beam. When an original plate having a portion with low flatness is used to form the embossed layer 11, a portion of the embossed layer 11 formed by transferring the shape of the portion of the original plate with low flatness also has low flatness. At the portion of the embossed layer 11 having low flatness, due to light scattering, guided-mode resonance is less likely to occur as compared with a portion of the embossed layer 11 having higher flatness. This reduces the intensity of the reflected light RL reflected by the color display 10. However, it is difficult to allow the portion irradiated with an electron beam to have high flatness by electron beam lithography.

Furthermore, a stamper for transferring the uneven shape of the original plate to the resin layer for forming the embossed layer is created from the original plate by electroforming. Then, the uneven shape of the stamper is transferred to a resin layer for forming the embossed layer 11 to form the embossed layer 11. Thus, in the embossed layer 11, the convex surfaces S1A have lower flatness than the concave surfaces S1B.

In the high refractive index layer 12, the thickness of the convex portion 12A is a peak thickness (hereafter "convex portion thickness"), the thickness of the concave portion 12B is a valley thickness (hereafter "concave portion thickness"), the volume density of the convex portion 12A is a peak density (hereafter "convex portion density"), and the volume density of the concave portion 12B is a valley density (hereafter "concave portion density"). In at least part of the high refractive index layer 12, the concave portion thickness may be greater than the convex portion thickness, or the concave portion density may be higher than the convex portion density. When the concave portion thickness is greater than the convex portion thickness, or the concave portion density is higher than the convex portion density, light is guided at higher efficiency in the third waveguide layer WG3 including the concave surfaces S1B than in the first waveguide layer WG1 including the convex surfaces S1A. This can prevent the low flatness of the convex surfaces S1A from reducing the intensity of the reflected light RL reflected by the color display 10.

In the step of forming the embossed layer 11, first, a synthetic resin for forming the embossed layer 11 is prepared. The synthetic resin for forming the embossed layer 11 may be a thermoplastic resin, a thermosetting resin, or a photocurable resin. Examples of synthetic resins include an acrylic resin, a urethane resin, and a urethane acrylic resin. Then, after application of a coating film containing the synthetic resin for forming the embossed layer 11, the uneven shape of the transfer plate is transferred to the coating film to obtain the embossed layer 11.

In the step of forming the high refractive index layer 12, the high refractive index layer 12 is formed to cover the surface 11S of the embossed layer 11. A dielectric for forming the high refractive index layer 12 may be a metal compound, silicon oxide ($SiO_2$), or the like. The metal compound may be a metal oxide, a metal sulfide, a metal fluoride, or the like. Examples of metal compounds include zinc oxide (ZnO), titanium oxide ($TiO_2$), zinc sulfide (ZnS), and magnesium fluoride (MgF).

By changing the degree of oxidation of a metal oxide from a first value to a second value, the refractive index of the metal oxide can be changed from a first value to a second value. Among metal oxides, $TiO_2$ has a high refractive index, and thus $TiO_2$ is suitable as a material for forming the high refractive index layer 12. When the refractive index of $TiO_2$ is changed from a first value to a second value, the volume density of $TiO_2$ may be changed from a first value to a second value. Under the assumption that the high refractive index layer 12 has a uniform thickness, as $TiO_2$ constituting the high refractive index layer 12 has a higher volume density, the high refractive index layer 12 has a higher refractive index.

The high refractive index layer 12 can be formed by a deposition method. The deposition method may be a chemical deposition method or a physical deposition method. The physical deposition method may be, for example, sputtering, vacuum deposition, or the like. Regardless of which deposition method is used, film forming species are more likely to reach the concave surfaces S1B of the embossed layer 11, and film forming species are less likely to reach the convex surfaces S1A of the embossed layer 11. Thus, in the high refractive index layer 12, the concave portion thickness of the concave portion 12B is more likely to be greater than the convex portion thickness of the convex portion 12A. Therefore, forming the high refractive index layer 12 having the concave portion thickness greater than the convex portion thickness is easier than forming the high refractive index layer 12 having the convex portion thickness greater than the concave portion thickness.

In the step of forming the protective layer 13, first, a synthetic resin for forming the protective layer 13 is prepared. The synthetic resin for forming the protective layer 13 may be a synthetic resin that can be used to form the embossed layer 11. A coating film containing the synthetic resin for forming the protective layer 13 is prepared, and then the coating film is applied to the high refractive index layer 12 to cover the high refractive index layer 12. Then, the coating film is cured to obtain the color display 10 including the protective layer 13.

As described above, the first embodiment of the color display, the authentication medium, and the method of determining the authenticity of the color display can achieve the following advantageous effects.

(1) The wavelengths of the reflected light RL derived from the waveguide layers WG1, WG2, and WG3 are determined by the values of the effective refractive indexes $n_{eff}$ of the waveguide layers WG1, WG2, and WG3, respectively. Thus, the wavelengths of the reflected light RL derived from the waveguide layers WG1, WG2, and WG3 can be adjusted by varying at least one of the thickness and the volume density of the high refractive index layer 12. This makes it possible to vary the wavelength of the light reflected by the color display due to guided-mode resonance according to the number or position of portions in which at least one of the thickness and the volume density is varied.

(2) A part of the first uneven portion in which the height of the first uneven surface 11S1 has the first value and a part of the first uneven portion in which the height of the first uneven surface 11S1 has the second value have different effective refractive indexes $n_{eff}$ of the waveguide layer. This enables the first uneven portion to reflect light having a different wavelength from light reflected by the first uneven portion having a uniform refractive index.

(3) By setting the width of the convex surfaces S1A to be different from the width of the concave surfaces S1B in the second uneven portion, the second uneven portion has a different effective refractive index $n_{eff}$ from the second uneven portion in which the convex surfaces S1A and the concave surfaces S1B have the same width. This enables the second uneven portion to reflect light having a different wavelength from light reflected by the second uneven portion in which the convex surfaces S1A and the concave surfaces S1B have the same width.

(4) It is possible to cause the difference between the effective refractive index $n_{eff}$ of the first waveguide layer WG1 and the effective refractive index $n_{eff}$ of the third waveguide layer WG3 to be larger than the difference between the first refractive index n1 and the third refractive index n3. This enables the difference between the wavelength of the light guided by the first waveguide layer WG1 and the wavelength of the light guided by the third waveguide layer WG3 to be larger than the difference between the first refractive index n1 and the third refractive index n3.

(5) When the concave portion thickness is greater than the convex portion thickness, or the concave portion density is higher than the convex portion density, light is guided at higher efficiency in the third waveguide layer WG3 including the concave surfaces S1B than in the first waveguide layer WG1 including the convex surfaces S1A. This can prevent the low flatness of the convex surfaces S1A from reducing the brightness of the reflected light RL reflected by the color display 10.

Second Embodiment

A second embodiment of a color display, an authentication medium, and a method of determining authenticity of the color display will be described with reference to FIGS. 21 to 31. The color display of the second embodiment differs from the color display 10 of the first embodiment in that the color display of the second embodiment further has an uneven surface having a shape different from that of the uneven surface of the color display 10 of the first embodiment. Thus, the differences of the color display of the second embodiment from the color display 10 of the first embodiment will be described in detail below. On the other hand, components of the color display of the second embodiment common to those of the color display 10 of the first embodiment are denoted by the same reference signs, and detailed description thereof will be omitted. The embossed layer, the color display, and functions of the color display will be described below in this order.

[Embossed Layer]

The embossed layer of the color display will be described with reference to FIGS. 21 to 24.

Figure 21:
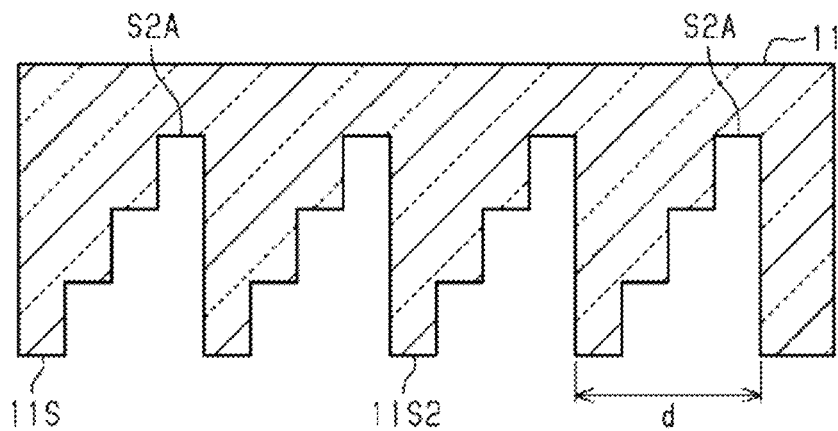
FIG. 21 is a schematic partial cross-sectional view illustrating a part of an embossed layer of a color display of a second embodiment.

FIG. 21 shows a part of a cross-sectional structure of the embossed layer 11. The cross-sectional structure shown in FIG. 21 is a cross-sectional structure orthogonal to a plane in which the color display is located and orthogonal to a direction in which the convex surfaces S1A of the first uneven surface 11S1 extend.

As shown in FIG. 21, the surface 11S of the embossed layer 11 includes a second uneven surface 11S2. In the present embodiment, the surface 11S of the embossed layer 11 includes the second uneven surface 11S2 in addition to the first uneven surface 11S1 described above.

The second uneven surface 11S2 includes a plurality of multi-level surfaces S2A having a plurality of levels. On the second uneven surface 11S2, the plurality of multi-level surfaces S2A are arranged with a predetermined period d. The period d of the multi-level surfaces S2A is a period that is longer than the period d of the first uneven surface 11S1 and which enables the multi-level surfaces S2A to reflect first-order diffracted light. The surface 11S of the embossed layer 11 includes the first uneven surface 11S1 and the second uneven surface 11S2; thus, it is difficult to counterfeit a color display including the embossed layer 11 as compared with the case where the surface 11S of the embossed layer 11 includes only the first uneven surface 11S1.

A direction in which the plurality of multi-level surfaces S2A are arranged may be the same as or different from the direction in which the convex surfaces S1A and the concave surfaces S1B are arranged on the first uneven surface 11S1. The period d of the multi-level surfaces S2A may be larger than 350 nm and 25,000 nm or less. The period d of the multi-level surfaces S2A when light diffraction is used to design the multi-level surfaces S2A can be set according to the following formula (10).

$$d\lambda = d(\sin \alpha + \sin \beta) \quad \text{Formula (10)}$$

In the formula (10), d is a period of the multi-level surfaces S2A, λ is a wavelength of light reflected by the second uneven surface 11S2, α is an incident angle at which incident light is incident on the second uneven surface 11S2, and β is a diffraction angle at which light is diffracted by the second uneven surface 11S2.

In the multi-level surfaces S2A, a surface constituting each of the levels mainly contributes to diffraction of light incident on the second uneven surface 11S2. Thus, as the multi-level surfaces S2A have a larger number of levels, the second uneven surface 11S2 has higher diffraction efficiency. In the color display shown in FIG. 21, the surface constituting each of the levels is substantially parallel to the surface of the embossed layer 11 opposite to the surface 11S. In this example, each of the multi-level surfaces S2A has three levels. Each of the multi-level surfaces S2A may have two levels, or four or more levels.

The second uneven surface 11S2 has a wave shape in which a plurality of waves having a multi-level shape are repeated in a cross section orthogonal to the plane in which the color display 10 is located and orthogonal to the direction in which the convex surfaces S1A of the first uneven surface 11S1 extend, and the wave shape of the second uneven surface 11S2 continues in the depth direction of the drawing sheet. The periodic structure composed of the multi-level surfaces S2A allows a reflection angle of first-order diffracted light reflected by the second uneven surface 11S2 to be only in a positive range or only in a negative range.

The surface constituting each of the levels of the multi-level surfaces S2A may be a developable surface as with the convex surfaces S1A and the concave surfaces S1B described above. In the example shown in FIG. 21, connection surfaces connecting the surfaces constituting the levels are substantially parallel to the thickness direction of the embossed layer 11. However, the connection surfaces may be taper surfaces or reverse taper surfaces as with the taper surfaces S1C described above.

The multi-level surfaces S2A may be reflection surfaces not based on light diffraction but based on geometrical optics. In such a case, light reflected by the second uneven surface 11S2 including the multi-level surfaces S2A is not iridescent, or is only slightly iridescent.

An inclination angle of the multi-level surfaces S2A may be an angle formed by a straight line passing through a center of the surface constituting each of the levels of the multi-level surfaces S2A and the surface of the embossed layer 11 opposite to the surface 11S in the direction in which the multi-level surfaces S2A are repeated. The direction in which light is reflected by the second uneven surface 11S2 is a direction corresponding to the inclination angle of the multi-level surfaces S2A.

When the second uneven surface 11S2 includes only the multi-level surfaces S2A having the same period d, first-order diffracted light reflected by the second uneven surface 11S2 is dispersed. This enables the observer OB observing the second uneven surface 11S2 to visually recognize an iridescent image displayed by the second uneven surface 11S2. The second uneven surface 11S2 displays a highly iridescent image particularly with a period d of 500 nm or more and 20,000 nm or less.

On the other hand, when the second uneven surface 11S2 is designed as follows, the second uneven surface 11S2 can reflect achromatic light. First, the predetermined period d calculated by the formula (10) is set as a reference period dr. Then, a plurality of discrete periods d are set in a positive direction with respect to the reference period dr, i.e., in a range larger than the reference period dr, and a plurality of discrete periods d are set in a negative direction with respect to the reference period dr, i.e., in a range smaller than the reference period dr. Then, the second uneven surface 11S2 is designed to include the multi-level surfaces S2A corresponding to the respective plurality of periods d set in this manner. The second uneven surface 11S2 allows first-order diffracted light reflected by a multi-level surface S2A having a first period d to have a different wavelength at a specific observation position OP from first-order diffracted light reflected by another multi-level surface S2A having a second period d different from the first period d. As a result, light beams having a plurality of wavelengths are mixed at the observation position OP, thus allowing the observer OB observing the second uneven surface 11S2 from the observation position OP to visually recognize an image formed by achromatic light, i.e., white light, displayed by the second uneven surface 11S2.

In designing the plurality of periods d described above, the reference period dr may be set to a period d with which light having a wavelength with a high luminous efficiency function can be reflected. The light having a wavelength with a high luminous efficiency function may be, for example, green light having a wavelength in the range of 540 nm or more and 560 nm or less. In this case, the light reflected by the second uneven surface 11S2 includes green light having a high luminous efficiency function and light having a luminous efficiency function similar to that of the green light. This makes it easy for the observer OB to visually recognize an image displayed by the second uneven surface 11S2. Furthermore, the light reflected by the second uneven surface 11S2 can include red light having a longer wavelength than the green light and blue light having a shorter wavelength than the green light. This makes it easy for the light reflected by the second uneven surface 11S2 to be achromatic light.

It is preferable that a multi-level surface S2A having the reference period dr have the highest density on the second uneven surface 11S2 and that a multi-level surface S2A having a period d that is more deviated from the reference period dr have a lower density on the second uneven surface 11S2. In that case, first-order diffracted light reflected to an observation position OP other than the above-described specific observation position OP can have a low intensity.

The second uneven surface 11S2 that can reflect achromatic light preferably satisfies the following formulas (11) to (13). In the formula (11), r is 221 or less.

[Math. 4]
$$\theta'_R = 2\left(\frac{-90}{255} \cdot r + 90\right) \qquad \text{Formula (11)}$$

[Math. 5]
$$\theta' = \frac{\theta'_R}{30} \qquad \text{Formula (12)}$$

[Math. 6]
$$\rho'_n = (\cos\theta'_n)^{\log(0.01)/\log\left(\cos\left(\frac{\theta'_R}{2}\right)\right)} \qquad \text{Formula (13)}$$

Figure 22:
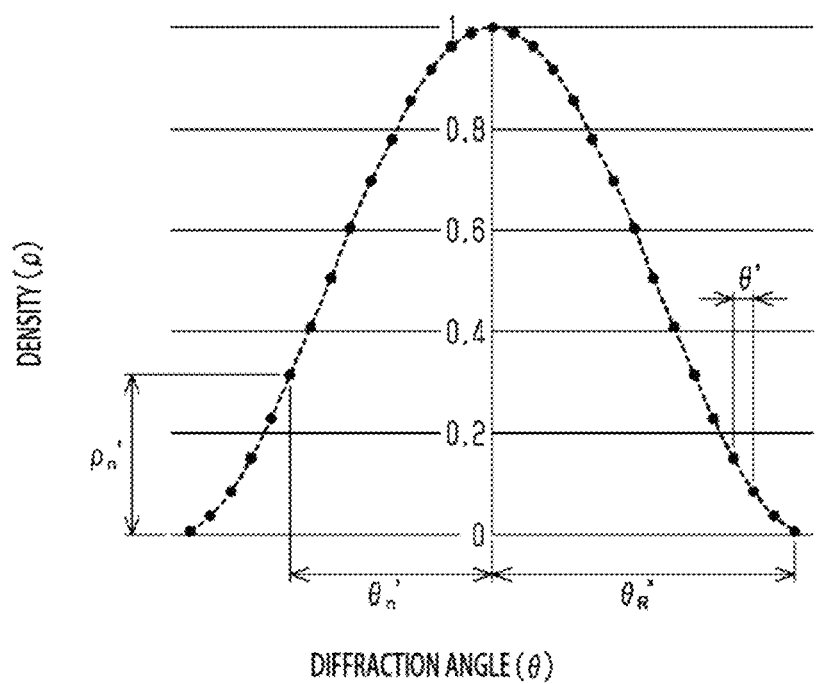
FIG. 22 is a graph showing a relationship between a density of multi-level surfaces and a diffraction angle.

FIG. 22 shows a curve satisfying the formulas (11) to (13).

As shown in FIG. 22, in the formulas (11) to (13), $\theta'_R$ is a range of a diffraction angle $\theta$. $\theta'$ is a discrete interval, i.e., a difference between the diffraction angle $\theta$ of first-order diffracted light diffracted by a multi-level surface S2A having a period d and the diffraction angle $\theta$ of first-order diffracted light diffracted by a multi-level surface S2A having the next larger period d or the next smaller period d. $\theta'_n$ is a discrete angle, i.e., a difference between the diffraction angle $\theta$ of first-order diffracted light diffracted by a multi-level surface S2A and the diffraction angle $\theta$ of first-order diffracted light diffracted by a multi-level surface S2A having the reference period dr. $\rho'_n$ is a density of a multi-level surface S2A having a specific discrete angle $\theta'_n$ in all the multi-level surfaces S2A.

On the second uneven surface 11S2 satisfying the formulas (11) to (13), the discrete angle $\theta'_n$, which is the diffraction angle $\theta$ of first-order diffracted light diffracted by each of the multi-level surfaces S2A, is changed by the discrete interval $\theta'$ with respect to 0° corresponding to the reference period dr. On the second uneven surface 11S2, the density of a multi-level surface S2A having the reference period dr has the maximal value, and a multi-level surface S2A having a larger discrete angle $\theta'_n$ has a lower density.

Thus, on the second uneven surface 11S2 satisfying the formulas (11) to (13), the period d of the multi-level surfaces S2A has a plurality of values. Therefore, counterfeiting of the second uneven surface 11S2, and thus counterfeiting of a color display having the second uneven surface 11S2 is difficult as compared with the case where the period d of the multi-level surfaces S2A of the second uneven surface 11S2 has only a single value.

The r-value is a parameter contributing to the range $\theta'_R$ of the diffraction angle $\theta$. The r-value is an important parameter for the light reflected by the second uneven surface 11S2 to have an achromatic color. The r-value is preferably 221 or less.

Figure 23:
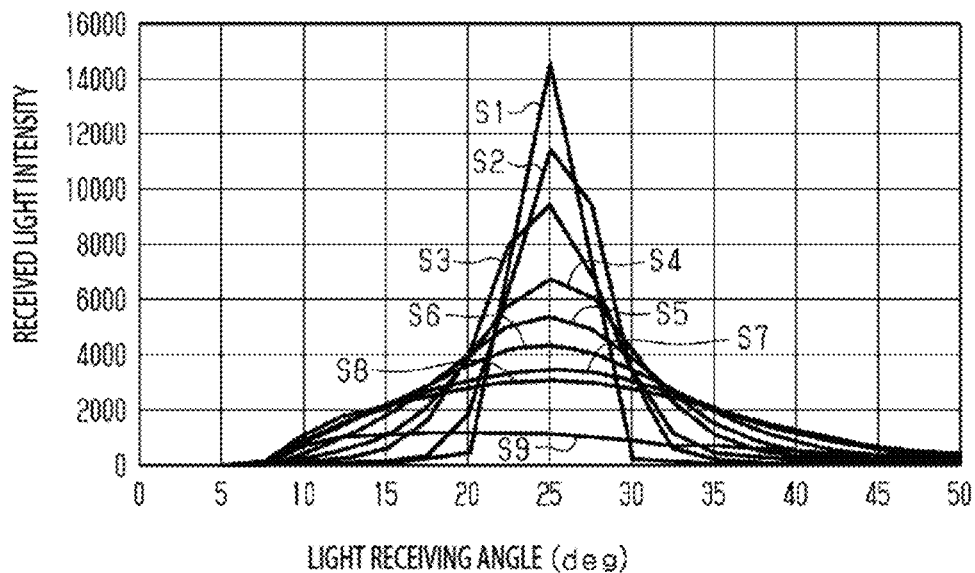
FIG. 23 shows spectra of light reflected by nine color displays having different r-values.

FIG. 23 shows spectra of light reflected by nine color displays having different r-values. The spectra shown in FIG. 23 are spectra obtained with the color displays, using, as a reference, their respective multi-level surfaces S2A that diffract light having a wavelength of 540 nm into the first order at an angle of 25° when the light is incident on the color displays at an angle of 0°, i.e., from directly above. The r-value of each of the color displays is set to a different one of 255, 238, 221, 204, 187, 170, 153, 136, and 119.

As shown in FIG. 23, a first spectrum S1 is obtained when the r-value is set to 255, a second spectrum S2 is obtained when the r-value is set to 238, and a third spectrum S3 is obtained when the r-value is set to 221. A fourth spectrum S4 is obtained when the r-value is set to 204, a fifth spectrum S5 is obtained when the r-value is set to 187, and a sixth spectrum S6 is obtained when the r-value is set to 170. A seventh spectrum S7 is obtained when the r-value is set to 153, an eighth spectrum S8 is obtained when the r-value is set to 136, and a ninth spectrum S9 is obtained when the r-value is set to 119. As is clear from the first spectrum S1 to the ninth spectrum S9, as the r-value is reduced, the range of the angle at which the light reflected from the color display is received, in other words, the range of the first-order diffraction angle, is increased. On the other hand, as is clear from the first spectrum S1 to the ninth spectrum S9, as the r-value is increased, the intensity of the light received at 25°, i.e., the intensity of the first-order diffracted light reflected at 25°, is increased.

Figure 24:
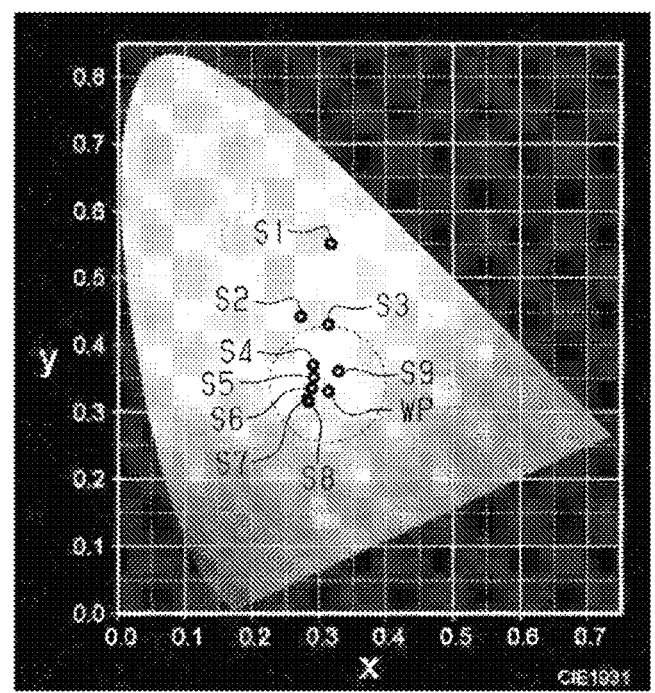
FIG. 24 shows colors of the light reflected by the nine color displays in an xy chromaticity diagram.

FIG. 24 shows positions of the light reflected by the nine color displays in an xy chromaticity diagram.

As shown in FIG. 24, the reflected light having the first spectrum S1 and the reflected light having the second spectrum S2 are green. On the other hand, the reflected light having any of the third spectrum S3 to the ninth spectrum S9 is white. Thus, the r-value in the formula (11) is preferably 221 or less. Furthermore, the r-value is preferably in the range of 204 or more and 221 or less. In that case, the reduction in the intensity of the reflected light can be prevented. In FIG. 24, the region surrounded by the dashed line is a region of white including a white point WP (x=0.33, y=0.33).

The second uneven surface 11S2 of the present embodiment is configured to display a second motif image having an achromatic color when the formulas (11) to (13) are satisfied. Thus, in the case where a first motif image is a chromatic image and the second motif image is an achromatic image, the visual attraction of the color display can be improved as compared with the case where both the first motif image and the second motif image are chromatic images or the case where both the first motif image and the second motif image are achromatic images.

A chromatic image is an image having a chromatic color. A chromatic image may be an image having a difference in hue. A chromatic image can have two regions in each of which a color difference $\Delta E^*ab=\sqrt{((\Delta a^*)^2+(\Delta b^*)^2)}$ of $a^*b^*$ is 5 or greater, in which $a^*b^*$ are values other than the brightness L of the color value $L^*a^*b^*$ in the CIE 1976 color space. In this case, the color value $L^*a^*b^*$ may be a color value $L^*a^*b^*$ in a region of 3 mm diameter. An achromatic image is an image having an achromatic color or a light color. An achromatic image may be a gray-scale image. An achromatic image may be colorless or monochrome. A chromatic image having higher saturation can more increase the variation in color even when the two regions have the same color difference. This allows the chromatic image to have an appearance with an intricate design. Furthermore, a chromatic image having higher saturation is more likely to have a better aesthetic appearance.

[Color Display]

The color display will be described with reference to FIGS. 25 to 31.

Figure 25A:
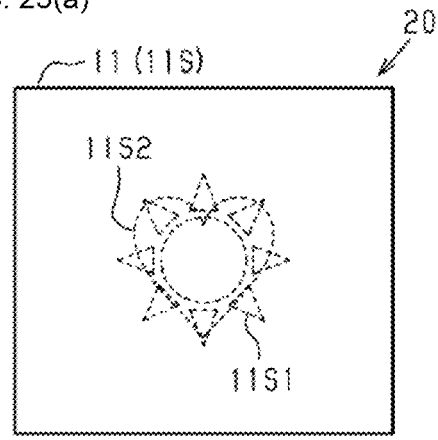
FIGS. 25(a)-25(b) are a set of plan views illustrating the color display.
Figure 25B:
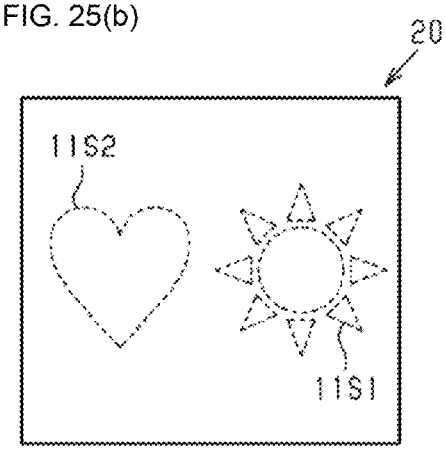

The color display of the present embodiment can display two images, that is, an image of a first motif displayed by the first uneven surface 11S1 and an image of a second motif displayed by the second uneven surface 11S2. The first motif can be composed of a structure of the first uneven surface 11S1, and the second motif can be composed of a structure of the second uneven surface 11S2. That is, the first uneven surface 11S1 may have a plurality of regions having different structures. Furthermore, the second uneven surface 11S2 may have a plurality of regions having different structures. FIG. 25(a)-25(b) are diagrams of a planar structure of the color display, illustrating a relationship between a position of the first uneven surface 11S1 and a position of the second uneven surface 11S2. Thus, a counterfeit product of the color display can be detected by visual observation according to a state in which the first motif image and the second motif image are displayed.

In a color display 20 shown in FIG. 25(a), the first uneven surface 11S1 is disposed at a position at which a center portion of the surface 11S is located, as viewed in a direction perpendicular to a plane in which the color display 20 is located. Furthermore, the second uneven surface 11S2 is disposed at a position at which the center portion of the surface 11S is located as with the first uneven surface 11S1. In this example, the outer shape of the first uneven surface 11S1 is a sun shape, and the outer shape of the second uneven surface 11S2 is a heart shape. However, the outer shape of the first uneven surface 11S1 and the outer shape of the second uneven surface 11S2 may be shapes different from these shapes. A part of the region defined by the outer shape of the first uneven surface 11S1 overlaps with a part of the region defined by the outer shape of the second uneven surface 11S2 as viewed in a direction perpendicular to the plane in which the color display 20 is located.

However, first pixels constituting the first uneven surface 11S1 do not overlap with second pixels constituting the second uneven surface 11S2 as viewed in a direction perpendicular to the plane in which the color display 20 is located. The first pixels are unit regions constituting the first uneven surface 11S1, and the second pixels are unit regions constituting the second uneven surface 11S2. This point will be described later with reference to FIG. 26(a)-26(c).

As shown in FIG. 25(b), the region defined by the outer shape of the first uneven surface 11S1 may not necessarily overlap with the region defined by the outer shape of the second uneven surface 11S2 as viewed in a direction perpendicular to the plane in which the color display 20 is located.

Figure 26A:
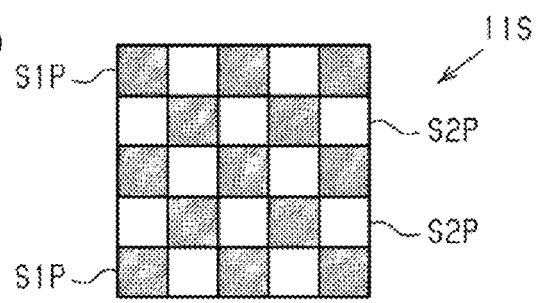
FIGS. 26(a)-26(c) are a set of plan views illustrating examples of arrangements of first pixels constituting a first uneven surface and second pixels constituting a second uneven surface.
Figure 26B:
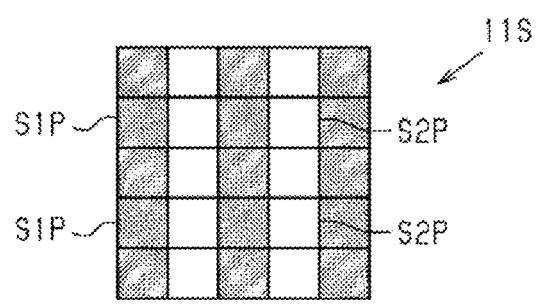
Figure 26C:
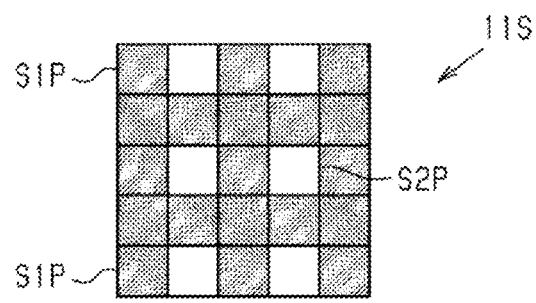

FIG. 26(a)-26(c) shows arrangements of pixels on a portion of the surface 11S on which a part of the region defined by the outer shape of the first uneven surface 11S1 overlaps with a part of the region defined by the outer shape of the second uneven surface 11S2.

As shown in FIG. 26(a), the first uneven surface 11S1 is composed of a plurality of first pixels S1P. The first uneven surface 11S1 is a set of first pixels S1P. The second uneven surface 11S2 is composed of a plurality of second pixels S2P. The second uneven surface 11S2 is a set of second pixels S2P.

In this example, each of the pixels S1P and S2P has a square shape. Each side of the pixels S1P and S2P preferably has a length in the range of 10 μm or more and 50 μm or less. In that case, the pixels S1P and S2P have a size smaller than the resolution of the human eye, thus preventing the observer OB from visually recognizing the pixels S1P and S2P.

In all the first pixels S1P constituting the first uneven surface 11S1, the convex surfaces S1A preferably extend in the same direction. In that case, the first motif displayed by the first uneven surface 11S1 has high brightness as compared with the case where the convex surfaces S1A of the first uneven surface 11S1 extend in a plurality of directions.

On the other hand, the plurality of second pixels S2P constituting the second uneven surface 11S2 are preferably configured such that in each of the second pixels S2P, the multi-level surfaces S2A extend in the same direction and that two or more of the plurality of second pixels S2P are different from each other in the direction in which the multi-level surfaces S2A extend. In the case where two or more of the plurality of second pixels S2P are different from each other in the direction in which the multi-level surfaces S2A extend, the second uneven surface 11S2 can include second pixels S2P having different levels of brightness when the second uneven surface 11S2 is observed from an observation position OP. In the plurality of second pixels S2P, the difference in angle between the directions in which the multi-level surfaces S2A extend is preferably 90° or less.

In the color display 20 shown in FIG. 26(a), on a part of the surface 11S, the first pixels S1P and the second pixels S2P are arranged in a checkered pattern. In the color display 20 shown in FIG. 26(b), on a part of the surface 11S, the first pixels S1P form columns and the second pixels S2P form columns, and the columns of first pixels S1P and the columns of second pixels S2P are alternately arranged. In the color display 20 shown in FIG. 26(c), each second pixel S2P is surrounded by a plurality of first pixels S1P. The arrangements of the first pixels S1P and the second pixels S2P shown in FIG. 26(a)-26(c) are examples of the arrangements of the pixels S1P and S2P.

Figure 27:
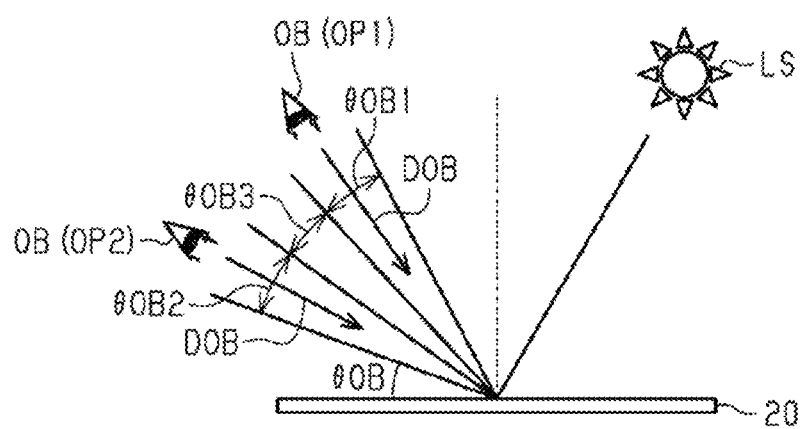
FIG. 27 is a schematic diagram illustrating a relationship between a first range and a second range of an observation angle.

FIG. 27 shows an angle at which the image of the first motif composed of the first uneven surface 11S1 can be observed when the observer OB observes the color display 20 and an angle at which the second motif composed of the second uneven surface 11S2 can be observed.

As shown in FIG. 27, an observation angle θOB is an angle formed by the plane in which the color display 20 is located and the plane including the line-of-sight direction DOB of the observer OB observing the color display 20. The first uneven surface 11S1 displays the first motif image observed in a first range θOB1 of the observation angle θOB. The second uneven surface 11S2 displays the second motif image observed in a second range θOB2 of the observation angle θOB. The first range θOB1 includes observation angles other than the observation angles θB included in the second range θOB2, and the second range θOB2 includes an observation angle θOB different from the observation angle θOB included in the first range θOB1. That is, at least part of the first range θOB1 is not included in the second range θOB2, and at least part of the second range θOB2 is not included in the first range θOB1.

Thus, the observation angle θOB of the color display 20 includes an observation angle θOB in which only the image of the first motif is displayed and the observation angle θOB in which only the image of the second motif is displayed. This allows the observer OB to visually recognize each of the images at a specific observation angle θOB without hindrance by another image. In other words, the observer OB can observe the image of the first motif when the viewpoint of the observer OB is located at a first observation position OP1. On the other hand, the observer OB can observe the second motif when the viewpoint of the observer OB is located at a second observation position OP2.

In the present embodiment, the second range θOB2 is a range of the observation angle θOB that is different from the first range θOB1. The color display 20 displays neither the image of the first motif nor the image of the second motif in a third range θOB3 of the observation angle θOB. The third range θOB3 includes the observation angle θOB between the first range θOB1 and the second range θOB2.

The first uneven surface 11S1 reflects light in the direction of specular reflection, and thus the first range θOB1 includes the direction of specular reflection. The observation angle θOB at which light is reflected by the second uneven surface 11S2 is determined by the period d of the multi-level surfaces S2A of the second uneven surface 11S2, the direction in which the multi-level surfaces S2A extend, and the inclination angle of the multi-level surfaces S2A.

Although the second range θOB2 is a range different from the first range θOB1 in the present embodiment, the second range θOB2 may include a part of the first range θOB1 and a range different from the first range θOB1. When the third range θOB3 of the observation angle θOB is set, in addition to the observation angle θOB between the first range θOB1 and the second range θOB2 described above, the third range θOB3 may include the following range. Specifically, the third range θOB3 may include a range that is between the plane in which the color display 20 is located and the second range θOB2 and that does not include the first range θOB1. Alternatively, the third range θOB3 may include a range that is between the plane in which the color display 20 is located and the first range θOB1 and that does not include the second range θOB2.

[Functions of Color Display]

Functions of the color display 20 will be described with reference to FIGS. 28 to 31. The following will describe the functions of the color display 20 when the color display 20 is applied to an authentication medium.

Figure 28:
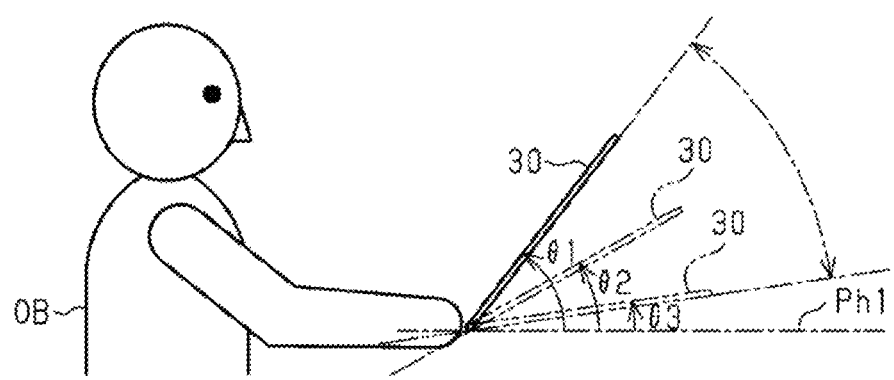
FIG. 28 is a schematic diagram illustrating a state in which the observer observes the color display.

As shown in FIG. 28, the observer OB of an authentication medium 30 may observe the authentication medium 30 while holding the authentication medium 30 in his/her hand. In the example shown in FIG. 28, the observer OB observes the authentication medium 30 while the authentication medium 30 is tilted by a first angle θ1 with respect to a reference surface Ph1 in the horizontal direction. Alternatively, the observer OB may observe the authentication medium 30 while the authentication medium 30 is tilted by a second angle θ2 with respect to the reference surface Ph1. Alternatively, the observer OB may observe the authentication medium 30 while the authentication medium 30 is tilted by a third angle θ3 with respect to the reference surface Ph1. The first angle θ1 is larger than the second angle θ2, and the second angle θ2 is larger than the third angle.

Figure 29A:
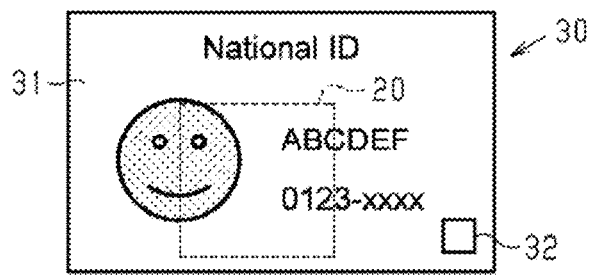
FIGS. 29(a)-29(c) is a set of plan views illustrating images displayed by an authentication medium including the color display.
Figure 29B:
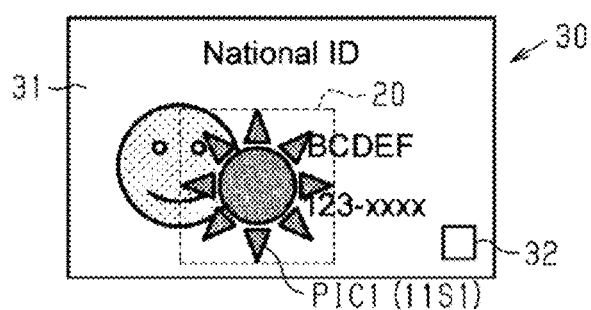
Figure 29C:
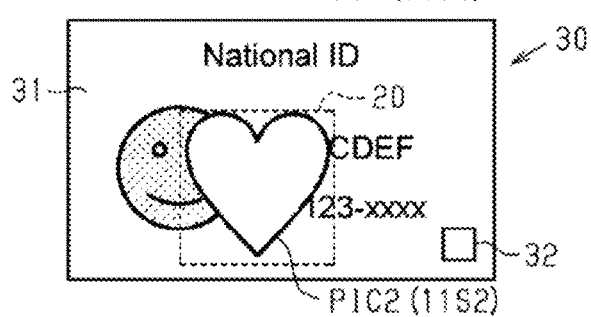

FIGS. 29(a)-29(c) shows a state of the authentication medium 30 visually recognized by the observer OB according to the tilt of the authentication medium 30.

As shown in FIG. 29(a), the authentication medium 30 includes the color display 20 and a support 31 that supports the color display 20. In the present embodiment, the authentication medium 30 further includes an information recording medium 32 that is supported by the support 31. The support 31 may be, for example, a sheet made of a synthetic resin. The support 31 may record various types of information. The various types of information can be recorded as digital data in the support 31. The various types of information may be, for example, the type of the authentication medium 30, and one or both of biometric information and non-biometric information on the authentication medium 30. Examples of the biometric information include the owner's facial image, iris pattern, vein pattern, signature, and fingerprint. The biometric information may be a feature value of each of the owner's facial image, iris pattern, vein pattern, signature, and fingerprint. Furthermore, hash data on the biometric feature value may be recorded as the biometric information. This enables detection of falsification of the stored biometric feature value.

The support 31 may record hash data of data stored in the information recording medium 32. The hash data can be used as an alternative means when the information recording medium 32 is damaged or when the data stored in the information recording medium 32 cannot be cryptographically or non-cryptographically verified. The hash data may be digital data. The hash data may be generated using a cryptographic hash function.

Examples of the non-biometric information include the owner's name, nationality, date of birth, and nationality code, an owner code, and a serial number. The information recording medium 32 may be, for example, an IC chip or the like. The authentication medium 30 may not necessarily include the information recording medium 32.

The information recording medium 32 can store digital data. The digital data may be, for example, data on the type of the authentication medium 30, and data on one or both of biometric information and non-biometric information on the authentication medium 30. Examples of the biometric information include the owner's facial image, iris pattern, vein pattern, signature, and fingerprint. The biometric information may be a feature value of each of the owner's facial image, iris pattern, vein pattern, signature, and fingerprint. Examples of the non-biometric information include the owner's name, nationality, date of birth, and nationality code, an owner code, and a serial number. The data stored in the information recording medium 32 can be cryptographically or non-cryptographically verified.

The authentication medium 30 has a state in which to the observation position OP of the observer OB, the first motif image is not displayed by the first uneven surface 11S1 and the second motif image is not displayed by the second uneven surface 11S2. A counterfeit product of the authentication medium 30 can be detected by visual observation, according to a state in which the first motif image and the second motif image are displayed. As described above, in the present embodiment, the authentication medium 30 displays neither the first motif image nor the second motif image when the observation angle θOB is in the third range θOB3. That is, the authentication medium 30 displays neither the first motif image nor the second motif image when the observer OB tilts the authentication medium 30 by the second angle θ2. In the state in which the authentication medium 30 displays neither the first motif image nor the second motif image, the information recorded in the support 31 can be easily read by the observer OB. In other words, in this state, the observer OB can easily read the information recorded in the support 31. This allows the observer OB to identify the owner of the authentication medium 30. Thus, when the color display 20 is observed by the observer OB in the third range θOB3 at the observation angle θOB, the image of the first motif and the image of the second motif displayed by the color display 20 can be observed to be different. The status of the color display body 20 can be easily determined by the observer OB.

As shown in FIG. 29(b), the authentication medium 30 has a state in which to the observation position OP of the observer OB, a first motif image PIC1 is displayed by the first uneven surface 11S1 but the second motif image is not displayed by the second uneven surface 11S2. As described above, in the present embodiment, the authentication medium 30 displays the first motif image PIC1 but does not display the second motif image when the observation angle θOB is in the first range θOB1. That is, the authentication medium 30 displays the first motif image PIC1 but does not display the second motif image when the observer OB tilts the authentication medium 30 by the first angle θ1.

As shown in FIG. 29(c), the authentication medium 30 has a state in which to the observation position OP of the observer OB, the first motif image PIC1 is not displayed by the first uneven surface 11S1 but a second motif image PIC2 is displayed by the second uneven surface 11S2. As described above, in the present embodiment, the authentication medium 30 does not display the first motif image PIC1 but displays the second motif image PIC2 when the observation angle θOB is in the second range θOB2. That is, the authentication medium 30 does not display the first motif image PIC1 but displays the second motif image PIC2 when the observer OB tilts the authentication medium 30 by the third angle θ3.

Figure 30A:
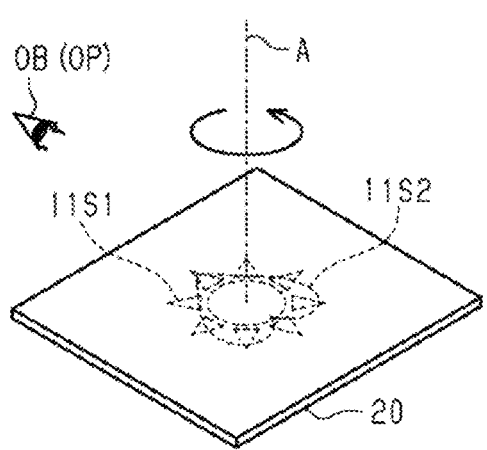
FIGS. 30(a)-30(b) is a set of diagrams illustrating a first position and a second position of the color display.
Figure 30B:
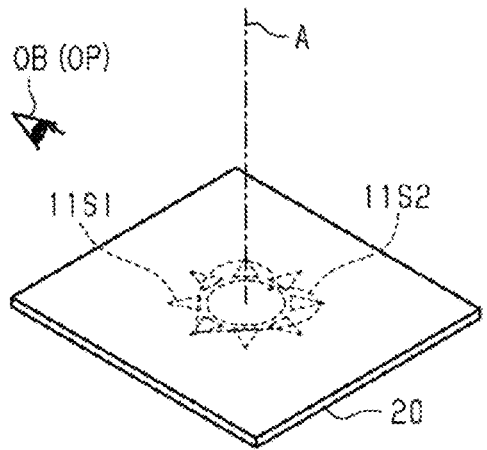

FIGS. 30(a)-30(b) shows a state in which the color display 20 is rotated around a rotation axis while the observation position OP of the observer OB and a position of a light source (not shown) are fixed.

As shown in FIG. 30(a), a rotation axis A is a normal line of the plane in which the color display 20 is located. The color display 20 is disposed at an arbitrary position, for example, along a surface parallel to the horizontal plane. The arbitrary position is a first position of the color display 20.

As shown in FIG. 30(b), the color display 20 may be located in a second position different from the first position. The second position is a position of the color display 20 rotated from the first position by 90° around the rotation axis A. Although the second position is obtained by rotating the color display 20 located in the first position counterclockwise by 90° in the present embodiment, the second position may be obtained by rotating the color display 20 clockwise by 90°.

The first uneven surface 11S1 displays the first motif image PIC1 having a first color to the observation position OP when the color display 20 is located in the first position. For example, the image PIC1 of the first motif is the first motif image PIC1 described above with reference to FIG. 30(b). The first color is a predetermined color that is a chromatic color.

Figure 31A:
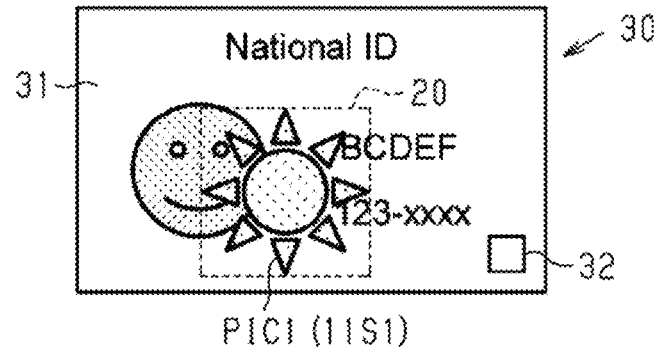
FIGS. 31(a)-31(b) is a set of plan views illustrating images displayed by the first uneven surface and the second uneven surface when the color display is in the second position.

On the other hand, as shown in FIG. 31(a), the first uneven surface 11S1 displays the first motif image PIC1 having a second color to the observation position OP when the color display 20 is located in the second position. The second color is different from the first color. The second color is also a predetermined color that is a chromatic color as with the first color. When the color display 20 is rotated, the apparent effective refractive index $n_{\mathit{eff}}$ of the color display 20 as viewed in the direction of the light incident on the color display 20 has a value different from the value before the color display 20 is rotated. Therefore, the first motif image PIC1 is visually recognized by the observer OB such that the color of the first motif image PIC1 when the color display 20 is located in the first position is different from the color of the first motif image PIC1 when the color display 20 is located in the second position.

The second uneven surface 11S2 displays the second motif image PIC2 having a first brightness to the observation position OP when the color display 20 is located in the first position. For example, the second motif image PIC2 having the first brightness is the second motif image PIC2 described above with reference to FIG. 30(b). The first brightness is a brightness level at which the observer OB can visually recognize that the color display 20 displays the second motif image PIC2.

Figure 31B:
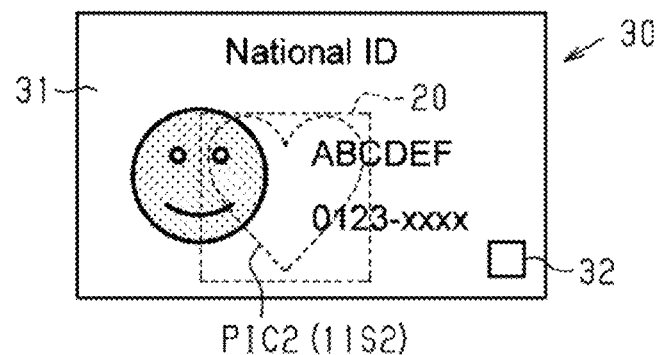

On the other hand, as shown in FIG. 31(b), the second uneven surface 11S2 displays the second motif image PIC2 having a second brightness to the observation position OP when the color display 20 is located in the second position. The second brightness is different from the first brightness. In this example, the second brightness is a brightness level at which the observer OB can visually recognize that the color display 20 displays the second motif image PIC2 and that is lower than the first brightness. The second brightness may be higher than the first brightness.

When the color display 20 is rotated, the orientation of the multi-level surfaces S2A of the second uneven surface 11S2 as viewed from the observer OB is changed from the orientation of the multi-level surfaces S2A before the color display 20 is rotated. This leads to a change in the ratio of light that can be observed by the observer OB in the light reflected by the multi-level surfaces S2A. Therefore, the second motif image PIC2 is visually recognized by the observer OB such that the brightness of the second motif image PIC2 when the color display 20 is located in the first position is different from the brightness of the second motif image PIC2 when the color display 20 is located in the second position.

Thus, the color display 20 can have two states that allow the observer OB to have different impressions of the first motif image PIC1, and two states that allow the observer OB to have different impressions of the second motif image PIC2.

As described above, the second embodiment of the color display, the authentication medium, and the method of determining the authenticity of the color display can achieve the following advantageous effects.

(6) The surface 11S of the embossed layer 11 includes the first uneven surface 11S1 and the second uneven surface 11S2; thus, the more intricate design makes it difficult to counterfeit a color display including the embossed layer 11 as compared with the case where the surface 11S of the embossed layer 11 includes only the first uneven surface 11S1.

(7) The visual attraction of the color display 20 can be improved as compared with the case where both the first motif image PIC1 and the second motif image PIC2 are chromatic images or the case where both the first motif image PIC1 and the second motif image PIC2 are achromatic images.

(8) The observation angle θOB of the color display 20 includes the observation angle θOB at which only the first motif image PIC1 is displayed and the observation angle θOB at which only the second motif image PIC2 is displayed. This allows the observer OB to visually recognize each of the images at a specific observation angle θOB without hindrance by another image.

(9) When the color display 20 is observed by the observer OB in the third range θOB3 of the observation angle θOB, the observer easily perceives a state of the color display 20 other than the first motif image PIC1 and the second motif image PIC2 displayed by the color display 20.

(10) The color display 20 can have two states that allow the observer OB to have different impressions of the first motif image PIC1, and two states that allow the observer OB to have different impressions of the second motif image PIC2.

[Modification of Second Embodiment]

The second embodiment described above may be modified and implemented as follows.

[Second Uneven Surface]

The second uneven surface 11S2 may be able to form an iridescent image using first-order diffracted light reflected to the observation position OP. In this case as well, the same or substantially the same advantageous effect as the effect (6) described above can be obtained.

The second uneven surface 11S2 may be able to display the second motif image PIC2 having the same brightness when the color display 20 is located in the first position and when the color display 20 is located in the second position. In this case as well, the same or substantially the same advantageous effect as the effect (7) described above can be obtained when the first uneven surface 11S1 displays a chromatic image and the second uneven surface 11S2 displays an achromatic image.

[Observation Angle]

The first range for the first uneven surface 11S1 may be the same as the second range for the second uneven surface 11S2. That is, the minimum value of the first range may be equal to the minimum value of the second range, and the maximum value of the first range may be equal to the maximum value of the second range. In this case as well, the same or substantially the same advantageous effect as the effect (7) described above can be obtained when the first uneven surface 11S1 displays a chromatic image and the second uneven surface 11S2 displays an achromatic image.

Third Embodiment

A third embodiment of a color display, an authentication medium, and a method of determining authenticity of the color display will be described with reference to FIGS. 32 to 34. The color display of the third embodiment differs from the color display 20 of the second embodiment in that the color display of the third embodiment can display a machine-readable code. Thus, the differences of the color display of the third embodiment from the color display 20 of the second embodiment will be described in detail below. On the other hand, components of the color display of the third embodiment common to those of the color display 20 of the second embodiment are denoted by the same reference signs, and detailed description thereof will be omitted. The color display, and the method of determining the authenticity of the color display will be described below.

[Color Display]

The color display will be described with reference to FIG. 32.

Figure 32:
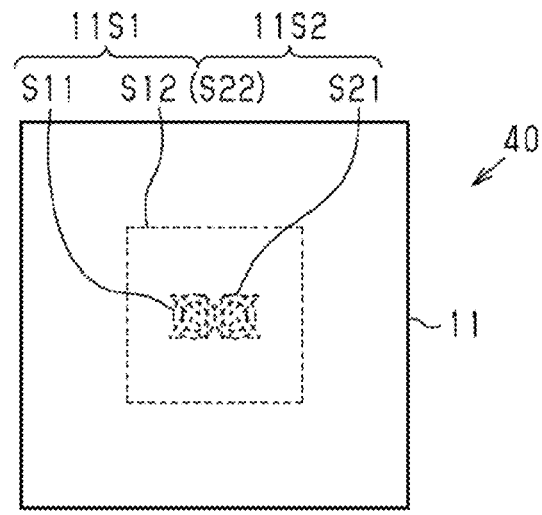
FIG. 32 is a plan view illustrating a color display of a third embodiment.

As shown in FIG. 32, the embossed layer 11 of a color display 40 is composed of the first uneven surface 11S1 and the second uneven surface 11S2. The first uneven surface 11S1 is composed of a first region S11 and a second region S12. The period d of the uneven surface in the first region S11 differs from the period d of the uneven surface in the second region S12. The second uneven surface 11S2 is composed of a first region S21 and a second region S22. The period d of the multi-level surfaces S2A in the first region S21 differs from the period d of the multi-level surfaces S2A in the second region S22. A region defined by the outer shape of the first uneven surface 11S1 overlaps with a region defined by the outer shape of the second uneven surface 11S2 as viewed in a direction perpendicular to a plane in which the color display 40 is located.

The first region S11 of the first uneven surface 11S1 is composed of a portion having a shape of the alphabet character "O" and a portion having a shape of the alphabet character "K" as viewed in a direction perpendicular to the plane in which the color display 40 is located. The second region S12 of the first uneven surface 11S1 has a shape surrounding the first region S11. As with the first region S11 of the first uneven surface 11S1, the first region S21 of the second uneven surface 11S2 has a portion having a shape of the alphabet character "O" and a portion having a shape of the alphabet character "K" as viewed in a direction perpendicular to the plane in which the color display 40 is located. However, the first region S21 of the second uneven surface 11S2 has a shape obtained by rotating the first region S11 of the first uneven surface 11S1 by 180° around a rotation axis that is a normal line of the plane in which the color display 40 is located and that passes through a center of the color display 40.

A part of the region defined by the first region S11 of the first uneven surface 11S1 overlaps with a part of the region defined by the first region S21 of the second uneven surface 11S2 as viewed perpendicular to the plane in which the color display 40 is located. A part of the region defined by the second region S12 of the first uneven surface 11S1 overlaps with a part of the region defined by the second region S22 of the second uneven surface 11S2 as viewed perpendicular to the plane in which the color display 40 is located.

As with the color display 20 of the second embodiment, the first uneven surface 11S1 is composed of a plurality of first pixels S1P, and the second uneven surface 11S2 is composed of a plurality of second pixels S2P. Portions of the surface 11S on which the plurality of first pixels S1P are located differ from portions of the surface 11S on which the plurality of second pixels S2P are located.

[Method of Determining Authenticity of Color Display]

A method of determining authenticity of the color display 40 will be described with reference to FIGS. 33 and 34.

As shown in FIG. 33, the method of determining the authenticity of the color display 40 includes machine reading light reflected by the first uneven surface 11S1 and machine reading light reflected by the second uneven surface 11S2. As described above, light incident on the first uneven surface 11S1 is reflected in the direction of specular reflection by the first uneven surface 11S1. Thus, in order to machine read the light reflected by the first uneven surface 11S1, the verifier VM is disposed so as to be able to detect light reflected at the reflection angle β that is equal to the incident angle α. On the other hand, in order to machine read the light reflected by the second uneven surface 11S2, the verifier VM is disposed so as to be able to detect light reflected at a reflection angle γ that is different from the reflection angle β. Although the reflection angle γ is larger than the reflection angle β in the present embodiment, the reflection angle γ may be smaller than the reflection angle β.

In the authenticity determination method, the light reflected by the first uneven surface 11S1 may be machine read before the light reflected by the second uneven surface 11S2 is machine read. Alternatively, in the authenticity determination method, the light reflected by the second uneven surface 11S2 may be machine read before the light reflected by the first uneven surface 11S1 is machine read.

FIGS. 34(a) and 34(b) shows the results of machine reading of light reflected by the color display 40. FIG. 34(a) shows the results of machine reading of light reflected by the first uneven surface 11S1, and FIG. 34(b) shows the results of machine reading of light reflected by the second uneven surface 11S2.

As shown in FIG. 34(a), the wavelength of the light reflected by the first region S11 of the first uneven surface 11S1 differs from the wavelength of the light reflected by the second region S12 of the first uneven surface 11S1; thus, the first region S11 and the second region S12 can be distinguished from each other in the results of the machine reading using the verifier VM. Thus, the color display 40 displays, as the first motif image PIC1, a machine-readable code composed of the first region S11 and the second region S12. Therefore, the results of the machine reading for the first motif image PIC1 can be used to determine the authenticity of the color display 40.

In the authenticity determination method, it is determined based on the results of the machine reading for the first uneven surface 11S1 whether the light reflected by the first uneven surface 11S1 forms the first motif image PIC1. The determination may be performed by the verifier VM. Alternatively, the determination may be performed by a computer connected to the verifier VM, based on the results of the machine reading received from the verifier VM. Alternatively, a computer connected to the verifier VM and to a determination server may transmit, to the server, the results of the machine reading received from the verifier VM, and receive the results of the determination from the server.

As shown in FIG. 34(b), the brightness of the light reflected by the first region S21 of the second uneven surface 11S2 differs from the brightness of the light reflected by the second region S22 of the second uneven surface 11S2; thus, the first region S21 and the second region S22 can be distinguished from each other in the results of the machine reading using the verifier VM. Thus, the color display 40 displays, as the second motif image PIC2, a machine-readable code composed of the first region S21 and the second region S22. Therefore, the results of the machine reading for the second motif image PIC2 can be used to determine the authenticity of the color display 40.

In the authenticity determination method, it is determined based on the results of the machine reading for the second uneven surface 11S2 whether the light reflected by the second uneven surface 11S2 forms the second motif image PIC2. The determination may be performed by the verifier VM, the computer, or the server as with the determination on the light reflected by the first uneven surface 11S1.

The authenticity determination method further includes determining that the color display 40 is genuine upon determination that the light reflected by the first uneven surface 11S1 forms the first motif image PIC1 and determination that the light reflected by the second uneven surface 11S2 forms the second motif image PIC2. In the case where the verifier VM performs the determination for the first uneven surface 11S1 and the determination for the second uneven surface 11S2, the verifier VM may also perform the determination whether the color display 40 is genuine. In the case where the computer described above performs the determination for the first uneven surface 11S1 and the determination for the second uneven surface 11S2, the computer may also perform the determination whether the color display 40 is genuine. In the case where the server described above performs the determination for the first uneven surface 11S1 and the determination for the second uneven surface 11S2, the server may also perform the determination whether the color display 40 is genuine.

In the authenticity determination method, it is determined that the color display 40 is counterfeit when the light reflected by the first uneven surface 11S1 does not form the first motif image PIC1 or when the light reflected by the second uneven surface 11S2 does not form the second motif image PIC2.

Thus, the method of determining the authenticity of the color display 40 makes it possible to determine whether the color display 40 is genuine based on the results of the machine reading of the light reflected by the first uneven surface 11S1 and the results of the machine reading of the light reflected by the second uneven surface 11S2.

As described above, the third embodiment of the color display, the authentication medium, and the method of determining the authenticity of the color display can achieve the following advantageous effects.

(11) The results of the machine reading for the first motif image PIC1 and the results of the machine reading for the second motif image PIC2 can be used to determine the authenticity of the color display.

(12) It is possible to determine whether the color display 40 is genuine based on the results of the machine reading of the light reflected by the first uneven surface 11S1 and the results of the machine reading of the light reflected by the second uneven surface 11S2.

The third embodiment described above may be appropriately modified and implemented as follows.

[Code]

The code that can be machine read by the verifier VM may be characters as described above, numbers, symbols, or the like, or a combination thereof. Alternatively, the code that can be machine read by the verifier VM may be a one-dimensional barcode, a two-dimensional barcode, or the like.

Fourth Embodiment

A fourth embodiment of a color display, an authentication medium, and a method of determining authenticity of the color display will be described with reference to FIGS. 35 to 37. The color display of the fourth embodiment is applied to a personal authentication medium including a layer that is modified by irradiation with a laser beam. Furthermore, the color display of the fourth embodiment includes a layer whose refractive index is changed by irradiation of the color display with a laser beam. Thus, these points will be described in detail below.

[Structure of Personal Authentication Medium]

The structure of the personal authentication medium will be described with reference to FIG. 35.

Figure 35:
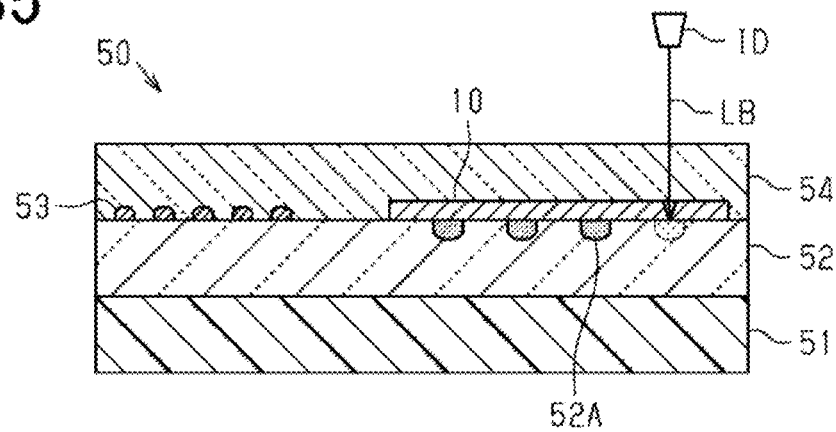
FIG. 35 is a cross-sectional view illustrating the structure of a personal authentication medium including the color display.

As shown in FIG. 35, a personal authentication medium 50 includes a first substrate 51, a second substrate 52, and a third substrate 54. The first substrate 51, the second substrate 52, and the third substrate 54 are laminated in this order. The color display 10 is located between the second substrate 52 and the third substrate 54. The color display 10 is located in a space formed between the second substrate 52 and the third substrate 54. In other words, the color display 10 is enclosed in a laminate composed of the second substrate 52 and the third substrate 54.

The first substrate 51 is a sheet made of a synthetic resin. The material for forming the first substrate 51 may be various synthetic resins. The first substrate 51 may or may not have transparency to visible light.

The second substrate 52 is an object to be irradiated with a laser beam LB from an irradiation device ID. The second substrate 52 is a sheet made of a synthetic resin. The second substrate 52 can be modified by irradiation with the laser beam LB. For example, a portion of the second substrate 52 that is irradiated with the laser beam LB and a portion of the second substrate 52 that is not irradiated with the laser beam LB can have different colors. For example, in the second substrate 52, the portion that is irradiated with the laser beam LB can have transmittance different from that of the portion of the second substrate 52 that is not irradiated with the laser beam LB. That is, the portion of the second substrate 52 that is irradiated with the laser beam LB and the portion of the second substrate 52 that is not irradiated with the laser beam LB have different optical characteristics.

Thus, the second substrate 52 can record an engraving 52A using the difference in the optical characteristics between the portion of the second substrate 52 that is irradiated with the laser beam LB and the portion of the second substrate 52 that is not irradiated with the laser beam LB. The engraving 52A can include at least one of the above-described types of information that can be recorded in the authentication medium 30.

The personal authentication medium 50 further includes a print 53. The print 53 is located on a surface of the second substrate 52 that is in contact with the third substrate 54. That is, the print 53 is sandwiched between the second substrate 52 and the third substrate 54. The print 53 may be formed by printing using ink. The print 53 can record information that can be recorded in the authentication medium 30 as with the engraving 52A. The information recorded in the engraving 52A may be the same as or different from the information recorded in the print 53.

The third substrate 54 is a sheet made of a synthetic resin. Various resins can be used as the material for forming the third base material 54. The third base material 53 has transparency to visible light. As a result, the light reflected by the engraving 52A, the print 53, and the color display body 10 is visually recognized via the third base material 54.

[Structure of Color Display]

The structure of the color display 10 will be described with reference to FIGS. 36 and 37. The color display 10 shown in FIGS. 36 and 37 is common to the color display 10 of the first embodiment in that the embossed layer 11, the high refractive index layer 12, and the adhesive layer 13 are provided. On the other hand, the color display 10 of the fourth embodiment differs from the color display of the first embodiment in that the color display 10 of the fourth embodiment has a modulation portion (described later).

Figure 36:
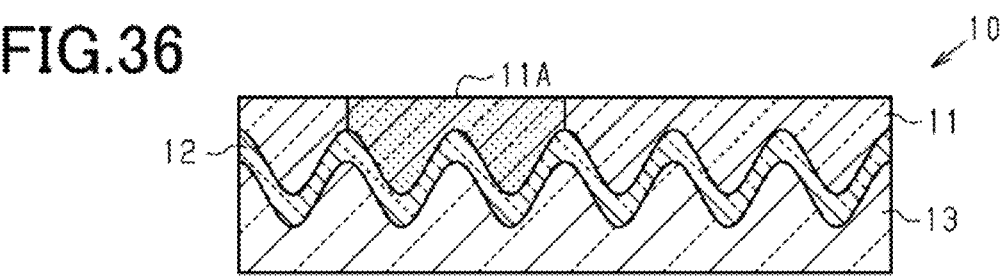
FIG. 36 is a cross-sectional view illustrating the structure of a first modification of the color display.

As shown in FIG. 36, for example, in the color display 10, the embossed layer 11 may have a modulation portion 11A. The modulation portion 11A has a refractive index different from that of a portion of the embossed layer 11 other than the modulation portion 11A. The modulation portion 11A is a portion of the embossed layer 11 that has been irradiated with the laser beam LB. The modulation portion 11A is a portion modified by absorbing energy from the laser beam LB with which the embossed layer 11 has been irradiated. The embossed layer 11 can record information using the difference in the refractive index between the modulation portion 11A and the portion of the embossed layer 11 other than the modulation portion 11A. The modulation portion 11A of the embossed layer 11 is not distinguished from the portion of the embossed layer 11 other than the modulation portion 11A when the color display 10 is observed by an observer with the naked eye. A spectrum of zero-order reflected light from the modulation portion 11A is bimodal or unimodal. A spectrum of zero-order reflected light from the portion of the embossed layer 11 other than the modulation portion 11A is bimodal or unimodal. The embossed layer 11 may be configured such that the spectrum of the zero-order reflected light from the modulation portion 11A is bimodal and the spectrum of the zero-order reflected light from the portion of the embossed layer 11 other than the modulation portion 11A is unimodal.

For example, by adding an infrared absorber to the synthetic resin for forming the embossed layer 11 or by using a synthetic resin having a molecular structure that absorbs infrared light, it is possible to obtain the embossed layer 11 that can have the modulation portion 11A by irradiation with the laser beam LB.

Figure 37:
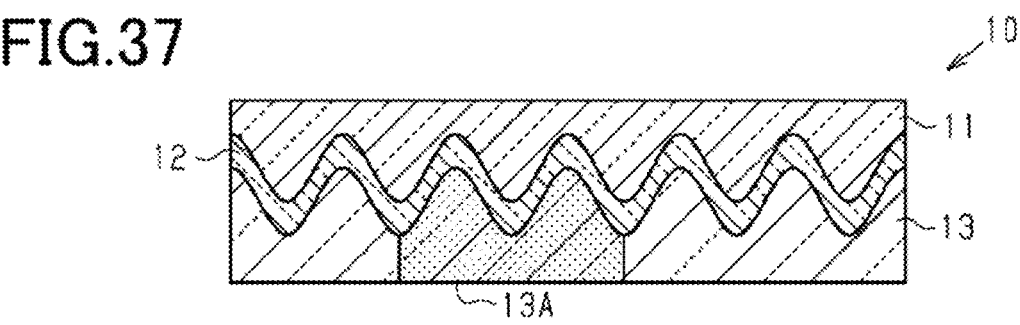
FIG. 37 is a cross-sectional view illustrating the structure of a second modification of the color display.

As shown in FIG. 37, in the color display 10, the protective layer 13 may have a modulation portion 13A. The modulation portion 13A is a portion of the protective layer 13 that is formed by irradiation of the protective layer 13 with the laser beam LB as with the modulation portion 11A of the embossed layer 11. The modulation portion 13A has a refractive index different from that of a portion of the protective layer 13 other than the modulation portion 13A. The color display 10 may be configured such that the embossed layer 11 has the modulation portion 11A and the protective layer 13 has the modulation portion 13A.

The information recorded in the color display 10 may be a product number, place information, or personal information. Of these, the personal information may be one or both of biometric information and non-biometric information as with the information recorded in the authentication medium 30. The information recorded in the color display 10 may be digital data. The non-biometric information may be hash data generated from the owner's name, nationality, date of birth, and nationality code, an owner code, and a serial number.

The hash data on the biometric information or the non-biometric information may be digital data. The hash data may be generated using a cryptographic hash function. The hash data on the biometric information enables detection of falsification of the stored biometric feature value.

The color display 10 may record hash data of the data stored in the information recording medium 32. The hash data can be used as an alternative means when the information recording medium 32 is damaged or when the data stored in the information recording medium 32 cannot be cryptographically or non-cryptographically verified. In particular, in the case where the hash data generated using a cryptographic hash function is recorded in the color display 10, both imitation of the color display and deciphering of the encrypted data are required to counterfeit an authentication medium, and this makes counterfeiting of the color display 10 difficult as compared with the case where the hash data is generated without using a cryptographic hash function.

The amount of digital data recorded in the color display 10 may be 1 bit or more and less than 1 Gbit. This data amount is suitable for a two-dimensional code and a one-dimensional code. The amount of digital data may be 2 bit or more and less than 10 kbit. This data amount is particularly suitable for hash data. The data recorded in the color display 10 may include an error detection code or an error correction code. This enables detection of partial damage to the data or correction of damaged data. The information recorded in the color display 10 may be binary data. When the information recorded in the color display 10 is binary data, it is possible to stabilize recording of information in the color display 10 and reading of the information from the color display 10.

The information recorded in the color display 10 may be ternary or more multi-valued data instead of binary data. In such a case, the color display 10 can record multi-valued data when at least one of the embossed layer 11 and the protective layer 13 has at least a modulation portion having a first refractive index and a modulation portion having a second refractive index. The second refractive index has a value different from that of the first refractive index. A more advanced manufacturing technique is required to form the embossed layer 11 or the protective layer 13 in which multi-valued data is recorded, and thus counterfeiting of the personal authentication medium 50 becomes more difficult.

The irradiation device ID for the laser beam LB may be a pulsed laser. If the power of the laser beam LB with which the color display 10 is irradiated by the irradiation device ID is insufficient, the refractive indexes of the embossed layer 11 and the protective layer 13 cannot be sufficiently modulated. If the power of the laser beam LB is excessively high, the embossed layer 11 and the protective layer 13 will be discolored due to heat generated in the color display 10 by irradiation with the laser beam LB. In this regard, when the irradiation device ID is a pulsed laser, the power of the laser beam LB can be easily modulated with an oscillation frequency.

The pulsed laser may be a solid-state laser. The solid-state laser may be a YVO4 laser or a YAG laser. The laser beam LB may have a wavelength of 1064 nm, 532 nm, or 355 nm. Of these wavelengths, 1064 nm is the wavelength of the fundamental wave of a YVO4 laser or a YAG laser, 532 nm is the wavelength of the second harmonic of a YVO4 laser or a YAG laser, and 355 nm is the wavelength of the third harmonic of a YVO4 laser or a YAG laser. Of these, the fundamental wave having a wavelength of 1064 nm has the largest output and is suitable for engraving. The fundamental wave is infrared light.

The oscillation frequency, i.e., Q-switch frequency, of the pulsed laser is preferably in the range of 1 kHz or more and 1 MHz or less. The pulsed laser beam preferably has a pulse width in the range of 1 ns or more and 100 ns or less. The energy of a single pulse of the pulsed laser beam is preferably in the range of 0.02 mJ or more and 20 mJ or less. The laser output is preferably in the range of 1 W or more and 20 W or less.

Both the second substrate 52 and the color display 10 may be simultaneously irradiated with the laser beam LB. This allows the engraving 52A formed in the second substrate 52 and the modulation portions 11A and 13A formed in the color display 10 to have approximately the same shape. Thus, when a color display 10 is removed from the personal authentication medium 50 including the second substrate 52 and the color display 10 obtained in this manner, and the color display 10 is adhered to another personal authentication medium or the like, the modulation portions 11A and 13A of the color display 10 can be detected in this personal authentication medium using a verifier. On the other hand, the engraving 52A having approximately the same shape as the modulation portions 11A and 13A cannot be detected in the personal authentication medium. Thus, the use of the modulation portions 11A and 13A and the engraving 52A enables detection of falsification of the personal authentication medium 50.

The personal authentication medium 50 may be configured to include the modulation portions 11A and 11B, but may not include the engraving 52A of the second substrate 52. In such a case, since the modulation portions 11A and 13A cannot be visually recognized with the naked eye as described above, the personal authentication medium 50 can record invisible information. The invisible information does not deteriorate the visibility and aesthetic appearance of the image displayed by the color display 10. Therefore, the modulation portions 11A and 13A enable the personal authentication medium 50 to record information while maintaining the visibility and aesthetic appearance of the image displayed by the color display 10.

According to the embodiments and modifications described above, the following supplementary note can be derived.

[Supplementary Note 1]

A color display including:

a forming mold that is optically transmissive, a deposited film that is optically transmissive and is located on the forming mold, and a plastic protector that is located on the deposited film, wherein the forming mold has a first refractive index, the plastic protector has a third refractive index, and the deposited film has a second refractive index, the second refractive index being higher than both the first refractive index and the third refractive index, the forming mold has a surface in contact with the deposited film, and at least part of the surface is a first wavy surface, a wave period of the first wavy surface being in a range of 250 nm or more and 500 nm or less, the deposited film conforms to the surface of the forming mold, the forming mold, the deposited film, and the plastic protector constitute a waveguide layer that is defined by a plane passing through a top portion of the forming mold and a plane passing through a bottom portion of the plastic protector, the waveguide layer includes a first waveguide layer, a second waveguide layer, and a third waveguide layer that are sequentially laminated, the first waveguide layer being composed of a part of the forming mold and a part of the deposited film, the second waveguide layer being composed of a part of the forming mold, a part of the deposited film, and a part of the plastic protector, the third waveguide layer being composed of a part of the deposited film and a part of the plastic protector, and two of the part of the deposited film included in the first waveguide layer, the part of the deposited film included in the second waveguide layer, and the part of the deposited film included in the third waveguide layer and the other one of the part of the deposited film included in the first waveguide layer, the part of the deposited film included in the second waveguide layer, and the part of the deposited film included in the third waveguide layer are different from each other in at least one of thickness and volume density.

Although the best mode for carrying out the present invention has been described with reference to the accompanying drawings, the scope of the present disclosure is not limited to the embodiments illustrated and described above, but also includes all embodiments that provide effects equivalent to those intended by the present invention. Furthermore, the scope of the present disclosure is not limited to the features of the invention defined by the claims, but includes all the disclosed features and all the combinations of the features.

The terms "part", "element", "region", "zone", "layer", "pixel", "surface", "display", "article", "record", "medium", "motif", "support", "print", and "engraving" used in the present disclosure represent physical entities. A physical entity can refer to a physical form or a spatial form surrounded by substances. A physical entity can be characterized by its material, physical properties, physical quantity, psychophysical quantity, arrangement, shape, outer shape, a statistic thereof, recorded information, recorded data, recorded code, readable information, readable data, readable code, ability, performance, appearance, color, spectrum, image to be formed/displayed, processing method, detection method, verification method, and determination method. Due to its characteristics, a physical entity may have a specific function. A set of physical entities having specific functions can exhibit a synergistic effect by the functions of the physical entities.

The terms, configurations, features, aspects, and embodiments should be interpreted with reference to the drawings as necessary. Matters that can be directly and unambiguously derived from the drawings should be a basis for amendment as with the text.

The terms used in the present disclosure, particularly in the claims are generally intended as "open" terms (e.g., the term "having" should be interpreted as "having at least", the term "including" should be interpreted as "including but not limited to", etc.). If no specific number is explicitly recited in the claims, there is no intent for any specific number. For example, as an aid to understanding, the claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation. Indefinite articles like "a" or "an" should be interpreted to mean at least ("one" or "one or more").

REFERENCE SIGNS LIST

10 . . . Color display; 11 . . . Embossed layer; 12 . . . High refractive index layer; 13 . . . Protective layer.

What is claimed is:

1. A color display, comprising:

a forming mold that is optically transmissive;

a deposited film that is optically transmissive and is located on the forming mold; and a plastic protector that is optically transmissive and is located on the deposited film, wherein the forming mold has a first refractive index, the plastic protector has a third refractive index, and the deposited film has a second refractive index, the second refractive index being higher than both the first refractive index and the third refractive index, the forming mold has a surface in contact with the deposited film, a part or an entire part of the surface being a first wavy surface, a wave period of the first wavy surface being in a range of 250 nm or more and 500 nm or less, the deposited film conforms to the surface of the forming mold, the first wavy surface includes a plurality of rib surfaces, a plurality of groove surfaces, and a plurality of taper surfaces connecting the rib surfaces to the respective groove surfaces, the deposited film has a peak zone in contact with one of the rib surfaces, a valley zone in contact with one of the groove surfaces, and a transition zone in contact with one of the taper surfaces, one of the peak zone, the valley zone, and the transition zone and another one of the peak zone, the valley zone, and the transition zone are different from each other in at least one of thickness and volume density, or one of the peak zone, the valley zone, and the transition zone has portions different from each other in at least one of thickness and volume density, the part of the surface of the forming mold is the first wavy surface, the other part of the surface of the forming mold includes a second wavy surface including a plurality of multi-level surfaces each having a plurality of levels, the plurality of multi-level surfaces are arranged with a predetermined period on the second wavy surface, the period of the multi-level surfaces being longer than the period of the first wavy surface and enabling the multi-level surfaces to reflect first-order diffracted light, an observation angle is defined as an angle formed by a plane in which the color display is located and a plane including a line-of-sight direction of an observer observing the color display, the first wavy surface displays a first motif image observed in a first range of the observation angle, the second wavy surface displays a second motif image observed in a second range of the observation angle, and at least part of the first range is not included in the second range, and at least part of the second range is not included in the first range.

2. The color display of claim 1, wherein the first wavy surface has a first wavy portion, the first wavy portion has a first rib surface and a second rib surface of the plurality of rib surfaces and a first groove surface and a second groove surface of the plurality of groove surfaces, the first groove surface is adjacent to the first rib surface, and the second groove surface is adjacent to the second rib surface, and in a thickness direction of the color display, a first height is defined as a distance between the first rib surface and the first groove surface, and a second height is defined as a distance between the second rib surface and the second groove surface, the first height being different from the second height.

3. The color display of claim 1, wherein the first wavy surface has a second wavy portion, and in a direction in which the rib surfaces and the groove surfaces are arranged, the second wavy portion has a third rib surface and a fourth rib surface of the plurality of rib surfaces and a third groove surface and a fourth groove surface of the plurality of groove surfaces, the third and fourth rib surfaces having a first width and the third and fourth groove surfaces having a second width, the first width being different from the second width.

4. The color display of claim 1, wherein the first refractive index is higher than the third refractive index, and the rib surfaces have a width greater than the groove surfaces in a direction in which the rib surfaces and the groove surfaces are arranged.

5. The color display of claim 1, wherein the first refractive index is lower than the third refractive index, and the rib surfaces have a width less than the groove surfaces in a direction in which the rib surfaces and the groove surfaces are arranged.

6. The color display of claim 1, wherein in the deposited film, a peak thickness is defined as a thickness of a portion of the deposited film in the peak zone, a valley thickness is defined as a thickness of a portion of the deposited film in the valley zone, a peak density is defined as a volume density of the portion of the deposited film in the peak zone, and a valley density is defined as a volume density of the portion of the deposited film in the valley zone, and in at least part of the deposited film, the valley thickness is greater than the peak thickness or the valley density is higher than the peak density.

7. The color display of claim 1, wherein the first wavy surface has a first wavy portion and a second wavy portion, a wave period of the first wavy portion is equal to a wave period of the second wavy portion, a spectrum of zero-order diffracted light reflected by the first wavy portion is bimodal, and a spectrum of zero-order diffracted light reflected by the second wavy portion is unimodal.

8. A method of determining authenticity of the color display of claim 7, comprising:

detecting a counterfeit product by visual observation using light reflected by the color display; and using a difference between a spectrum of zero-order diffracted light reflected by the first wavy portion and a spectrum of zero-order diffracted light reflected by the second wavy portion to verify the authenticity based on one or both of the first wavy portion and the second wavy portion distinguished from each other using a verifier.

9. The color display of claim 1, wherein hash data of data on non-biometric information, biometric information, or a biometric feature value is recorded in the color display.

10. The color display of claim 1, wherein the second range is not included in the first range of the observation angle, and the color display displays neither the first motif image nor the second motif image in a third range of the observation angle, the third range including the observation angle between the first range and the second range.

11. The color display of claim 1, wherein the first motif image is a chromatic image, and the second motif image is an achromatic image.

12. The color display of claim 11, wherein an observation position is defined as a position of a viewpoint of the observer observing the color display, a first position and a second position are defined as positions of the color display with respect to a rotation axis that is a normal line of the plane in which the color display is located, the second position being a position of the color display rotated from the first position by 90° around the rotation axis, the first wavy surface displays the first motif image having a first color to the observation position when the color display is in the first position, and displays the first motif image having a second color to the observation position when the color display is in the second position, the second color being different from the first color, and the second wavy surface displays the second motif image having a first brightness to the observation position when the color display is in the first position, and displays the second motif image having a second brightness to the observation position when the color display is in the second position, the second brightness being different from the first brightness.

13. A method of determining authenticity of the color display of claim 12, comprising:

machine reading light reflected by the first wavy surface;

machine reading light reflected by the second wavy surface;

verifying the authenticity of the color display, based on a result of the machine reading of the light reflected by an image for the first wavy surface;

determining, based on a result of the machine reading for the second wavy surface, whether the light reflected by the second wavy surface forms the second motif image; and determining that the color display is genuine upon determination that the light reflected by the first wavy surface forms the first motif image and determination that the light reflected by the second wavy surface forms the second motif image.

14. The color display of claim 1, wherein each of the first motif image and the second motif image is a machine-readable code.

15. An authentication medium, comprising:
the color display according to claim 1; and
a support that supports the color display.

* * * * *